US008593502B2

(12) United States Patent
Saleh et al.

(10) Patent No.: US 8,593,502 B2
(45) Date of Patent: *Nov. 26, 2013

(54) CONTROLLING VIDEOCONFERENCE WITH TOUCH SCREEN INTERFACE

(75) Inventors: Youssef Saleh, Arlington, MA (US); Mark Duckworth, Merrimack, NH (US); Gopal Paripally, N. Andover, MA (US); Everett Hiller, Austin, TX (US); Britt Nelson, Austin, TX (US); Wallace Henry, Leander, TX (US)

(73) Assignee: Polycom, Inc., San Jose, CA (US)

( * ) Notice: Subject to any disclaimer, the term of this patent is extended or adjusted under 35 U.S.C. 154(b) by 77 days.

This patent is subject to a terminal disclaimer.

(21) Appl. No.: 13/008,280

(22) Filed: Jan. 18, 2011

(65) Prior Publication Data

US 2011/0234746 A1 Sep. 29, 2011

Related U.S. Application Data

(63) Continuation-in-part of application No. 11/307,194, filed on Jan. 26, 2006.

(60) Provisional application No. 61/299,662, filed on Jan. 29, 2010.

(51) Int. Cl.
*H04N 7/15* (2006.01)

(52) U.S. Cl.
USPC ............... 348/14.03; 348/14.08; 348/14.09; 348/14.12

(58) Field of Classification Search
USPC ............ 348/14.01–14.16; 715/753; 370/260–261; 709/204–205
See application file for complete search history.

(56) References Cited

U.S. PATENT DOCUMENTS

| 4,516,156 A | 5/1985 | Fabris et al. |
| 5,767,897 A | 6/1998 | Howell |

(Continued)

FOREIGN PATENT DOCUMENTS

| EP | 1178683 | 2/2002 |
| EP | 1503588 | 2/2005 |

(Continued)

OTHER PUBLICATIONS

European Search Report in counterpart EP Appl. No. EP 07000565.7, dated Sep. 16, 2011.

(Continued)

*Primary Examiner* — Melur Ramakrishnaiah
(74) *Attorney, Agent, or Firm* — Wong, Cabello, Lutsch, Rutherford & Brucculeri, L.L.P.

(57) ABSTRACT

A videoconferencing system includes a touch screen display device and a videoconferencing unit. The display device displays video data for the videoconference and generates touch data based on user selections relative to the touch screen. The videoconferencing unit is operatively coupled to the touch screen device by a video connection and a data interface connection, for example. The unit establishes and conducts a videoconference with one or more endpoints via a network. The unit sends video data to the display device and receives touch data from the device. The received touch data is used to control operation of the videoconferencing system. The received touch data can be used to initiate a videoconference call, change an operating parameter, change orientation of a camera, initiate a picture-in-picture display, access a menu, access memory, change a source of video data, initiate a whiteboard display, and access a screen of a connected device.

43 Claims, 36 Drawing Sheets

(56) References Cited

U.S. PATENT DOCUMENTS

| | | | |
|---|---|---|---|
| 5,872,922 | A | 2/1999 | Hogan et al. |
| 6,256,033 | B1 | 7/2001 | Nguyen |
| 6,313,853 | B1 | 11/2001 | Lamontagne et al. |
| 6,803,906 | B1 | 10/2004 | Morrison et al. |
| 6,919,880 | B2 | 7/2005 | Morrison et al. |
| 6,947,032 | B2 | 9/2005 | Morrison et al. |
| 7,355,593 | B2 | 4/2008 | Hill et al. |
| 7,428,000 | B2 | 9/2008 | Cutler et al. |
| 7,532,206 | B2 | 5/2009 | Morrison et al. |
| 2002/0002629 | A1 | 1/2002 | Fukushima |
| 2004/0217946 | A1 * | 11/2004 | Hamano ............ 345/173 |
| 2005/0104864 | A1 | 5/2005 | Zhang et al. |
| 2005/0128285 | A1 * | 6/2005 | Berenguer ............ 348/14.08 |
| 2006/0026535 | A1 * | 2/2006 | Hotelling et al. ............ 715/863 |
| 2010/0318921 | A1 * | 12/2010 | Trachtenberg et al. ....... 715/751 |
| 2011/0029893 | A1 * | 2/2011 | Roberts et al. ............ 715/753 |

FOREIGN PATENT DOCUMENTS

| | | |
|---|---|---|
| JP | 2005-521340 | 7/2005 |
| WO | WO 9407327 A1 * | 3/1994 |
| WO | 9637069 | 11/1996 |
| WO | 03081892 A2 | 10/2003 |

OTHER PUBLICATIONS

SMART Technologies, "SMART—3000i Features," obtained from http://www2.smarttech.com/, copyright 2006, 6-pgs.

SMART Technologies, "Rear Projection SMART—3000i," copyright 2005, 2-pgs.

SMART Technologies, "Rear Projection SMART Board (TM) Interactive Whiteboard," copyright 2003, 1-pg.

SMART Technologies, "Rear Projection SMART Board (TM) Interactive Whiteboard," copyright 2003-2005, 3-pgs.

SMART Technologies, "Room Control Module for the 3000i," copyright 2004-2005, 1-pg.

SMART Technologies, "User's Guide: ConferencePilot(TM)," copyright 2004, 11-pgs.

Polycom, "Polycom(R) 3000iPower(TM) Integrated Solution," undated, 2-pgs.

Polycom, "iPower(TM) Product Line," Apr. 2003, 4-pgs.

Boeckeler Instruments, "Pointmaker(R) UTROL(R)-MT A/V Remote Control System," copyright 1994-2002, 2-pgs.

Boeckeler Instruments, "Pointmaker(R) PVI(TM)-83 Multiple-Sync Video Maker," copyright 1994-2004, 2-pgs.

Boeckeler Instruments, "Pointmaker(R) PVI(TM)-83 Multiple-Sync Video Maker with Keyboard: User's Manual," copyright 1995-2003, 168-pgs.

Examiner's first report of Australian Patent Application No. 2007200098, dated Apr. 10, 2008.

Chinese First Office Action dated Mar. 27, 2009 re: corresponding Patent Application No. 200710007201.4.

Office Action from corresponding Japanese Patent application No. 2007-013886 and translation, dated Dec. 2, 2009, 3-pgs.

Examination Report in counterpart EP Appl. No. EP 07000565.7, dated Feb. 12, 2013.

\* cited by examiner

FIG. 19B

CONTROLLING VIDEOCONFERENCE WITH TOUCH SCREEN INTERFACE

CROSS-REFERENCE TO RELATED APPLICATIONS

This is continuation-in-part of U.S. application Ser. No. 11/307,194, filed 26 Jan. 2006 and claims priority to U.S. Prov. Appl. Ser. No. 61/299,662, filed 29 Jan. 2010, which are both incorporated herein by reference in their entireties and to which priority is claimed.

FIELD OF THE DISCLOSURE

The subject matter of the present disclosure relates to a system and method for controlling a videoconference with a touch screen interface and relates to a touch panel-based control peripheral for videoconferencing systems.

BACKGROUND

Videoconferencing systems have continued to increase in popularity due to their ever-expanding ability to provide rich interaction among participants who are geographically situated. Among the features that provide this rich interaction are high definition video, high quality audio, multipoint/multi-participant calls, and the ability to integrate additional content, such as presentation date, shared files, shared media content, etc. One problem with this ever-expanding capability set is the corresponding complexity needed to set up and use such a wide array of features. Additionally, the complexity of the network environments in which videoconferencing systems are typically used requires a veritable plethora of settings for such things as call routing, firewall traversal, etc.

Typically, users of videoconferencing systems use remote controls to operate and control the systems. Traditionally, for example, videoconferencing devices have been controlled by RF or infrared remotes similar to those used to control televisions or other A/V devices. In addition, control panels, tablet input devices, keypads, or web interfaces can be used to operate and control the systems. When using a hand held remote, a user aims the remote at the videoconferencing system and navigates through numerous selections and menus of a user interface to operate and control the system. Tablet input devices and keyboards typically must be appropriately connected to the videoconferencing system, and proper connection may be difficult for users. For videoconferences, users may also wish to set up a document camera or a computer with annotation tools for the user to be able to add writing and annotations to the videoconference. Unfortunately, document cameras and computers with annotation tools may be difficult to set up and use with videoconferencing systems.

One prior art videoconferencing system known in the art is the 3000iPower available from Polycom, Inc. The 3000iPower includes a Polycom iPower 9800 and a Rear Projection SMART Board™ 3000i interactive whiteboard from SMART Technologies, Inc. The iPower 9800 has a PC-based design so that it essentially operates as a computer. The 3000iPower allows computer images to be projected and viewed within a videoconference call, and the 3000iPower offers touch screen controls that provide access to conference applications. A user can use a pen from a pen tray of the 3000iPower and make notes on a whiteboard or highlight important information.

The ever-expanding number of features and settings of videoconferencing systems, particularly those used in enterprise environments, has required the addition of complex menu structures that are accessed using these remotes and displayed on the conferencing display. Problems with such interfaces include the inherent complexity, in that users who may not be familiar with all of the features or settings may find it difficult to find the particular features or settings they need to interact with to establish or control a conference in which they are participating. Additionally, while participating in a conference, accessing such features tends to obscure the display of the other conference participants, which detracts from the life-like interaction that is so beneficial an aspect of videoconferencing. Improvements to these interfaces are thus desirable.

The subject matter of the present disclosure is directed to overcoming, or at least reducing the effects of, one or more of the problems set forth above.

SUMMARY

A videoconferencing system includes a touch screen display device and a videoconferencing unit. The display device displays video data for the videoconference and generates touch data based on user selections relative to the touch screen. The videoconferencing unit is operatively coupled to the touch screen device by a video connection and a data interface connection, for example. The unit establishes and conducts a videoconference with one or more endpoints via a network. The unit sends video data to the display device and receives touch data from the device. The received touch data is used to control operation of the videoconferencing system. The received touch data can be used to initiate a videoconference call, change an operating parameter, change orientation of a camera, initiate a picture-in-picture display, access a menu, access memory, change a source of video data, initiate a whiteboard display, and access a screen of a connected device.

Additionally, a touch panel-based controller for a videoconferencing system can be used to address one or more of the typical drawbacks discussed previously. In some embodiments, the touch panel can be incorporated into the display for the videoconferencing unit. In other embodiment, the touchpanel can be a separate unit located on a table at which one or more conference participants are sitting to provide ready access to various conference control features.

Additionally, the touch panel can provide a simplified and intuitive menu structure for controlling the videoconferencing system. Such a menu structure can place commonly used items together in a logical manner, while similarly putting less-commonly used features together in a similarly logical manner where they will be out of the way of users who may not need such items but still be readily accessible to those users that do. Further aspects of the touch panel-based controller are described below.

The foregoing summary is not intended to summarize each potential embodiment or every aspect of the present disclosure.

BRIEF DESCRIPTION OF THE DRAWINGS

The foregoing summary, preferred embodiments, and other aspects of subject matter of the present disclosure will be best understood with reference to a detailed description of specific embodiments, which follows, when read in conjunction with the accompanying drawings, in which:

FIGS. 19A-19B illustrate calendar related menus of the touch panel device.

Figure 1:
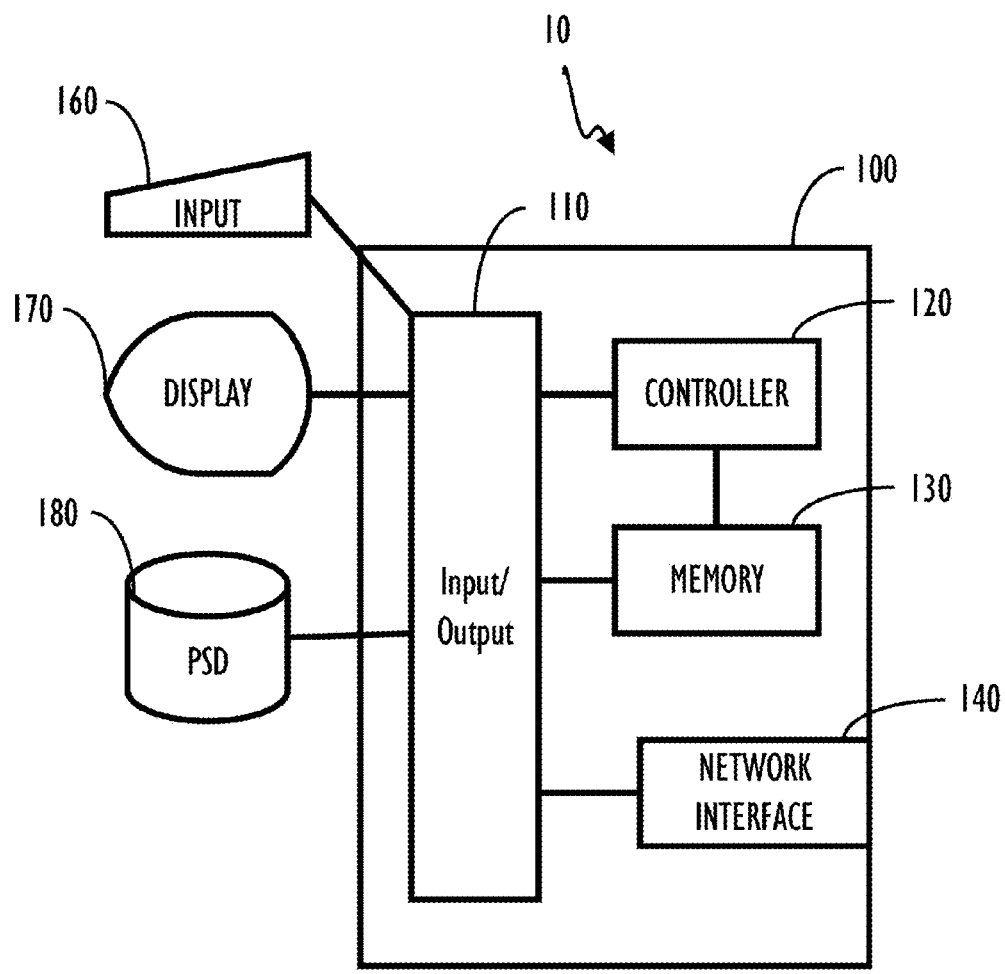
FIG. 1 shows a block diagram of a videoconferencing system according to certain teachings of the present disclosure.

While the subject matter of the present disclosure is susceptible to various modifications and alternative forms, specific embodiments thereof have been shown by way of example in the drawings and are herein described in detail. The figures and written description are not intended to limit the scope of the inventive concepts in any manner. Rather, the figures and written description are provided to illustrate the inventive concepts to a person skilled in the art by reference to particular embodiments, as required by 35 U.S.C. §112.

DETAILED DESCRIPTION

Referring now to FIG. 1, an exemplary videoconferencing system 10 has a programmable control device or videoconferencing unit 100, which may be optionally connected to input 160 (e.g., keyboard, mouse, touch screen, etc.), display 170, or program storage device (PSD) 180. Also, included in the videoconferencing unit 100 is a network interface 140 for communication via a network with other conferencing and corporate infrastructure devices (not shown). The network interface 140 may be included within the unit 100 or be external thereto. In either case, the videoconferencing unit 100 will be communicatively coupled to the network interface 140. Also note that the program storage unit 180 represents any form of non-volatile storage including, but not limited to, all forms of optical and magnetic storage elements including solid-state storage. Examples of the videoconferencing system 10 include but are not limited to, personal computers, video conferencing endpoints, video conferencing data recorders, and MCUs.

The videoconferencing unit 100 may be included in a conferencing device and be programmed to perform methods in accordance with this disclosure. In general, the videoconferencing unit 100 has a processor unit or controller 120, input-output (I/O) interface 110, and memory 130. The controller 120 may include any programmable controller device including, for example, the Intel Core®, Pentium® and Celeron® processor families from Intel and the Cortex and ARM processor families from ARM. (INTEL CORE, PENTIUM, and CELERON are registered trademarks of the Intel Corporation. CORTEX is a registered trademark of the ARM Limited Corporation. ARM is a registered trademark of the ARM Limited Company.) The memory 130 may include one or more memory modules and comprise random access memory (RAM), read only memory (ROM), programmable read only memory (PROM), programmable read-write memory, and solid-state memory. One of ordinary skill in the art will also recognize that the controller 120 may also include some internal memory including, for example, cache memory.

As noted above, the input 160 can be a keyboard, mouse, touch screen, etc. For its part, the display 170 can be a television, computer screen, a video projector, or other audio-visual equipment for displaying videoconferencing content. The input 160 and display 170 may be separate components, or the features of both can be combined into one component and may even be combined into the videoconferencing unit. In particular, the input 160 and display 170 can be incorporated into a touch screen device as disclosed herein.

Various embodiments for the features of the input 160 and display 170 for the videoconferencing system 10 are disclosed below. The input 160 is a touch panel-based input for the videoconferencing system 10, which can be used to address one or more of the typical drawbacks associated with current systems. In some embodiments, the touch-panel input 160 can be incorporated into the display 170 for the videoconferencing unit 110. In other embodiment, the touch-panel input 160 can be a separate unit located on a table at which one or more conference participants are sitting to provide ready access to various conference control features.

Additionally, the touch-panel input 160 can provide a simplified and intuitive menu structure for controlling the videoconferencing system 10. Such a menu structure can place commonly used items together in a logical manner, while similarly putting less-commonly used features together in a similarly logical manner where they will be out of the way of users who may not need such items, but still be readily accessible to those users that do. Further aspects of the touch-panel input 160 are described below.

Figure 2:
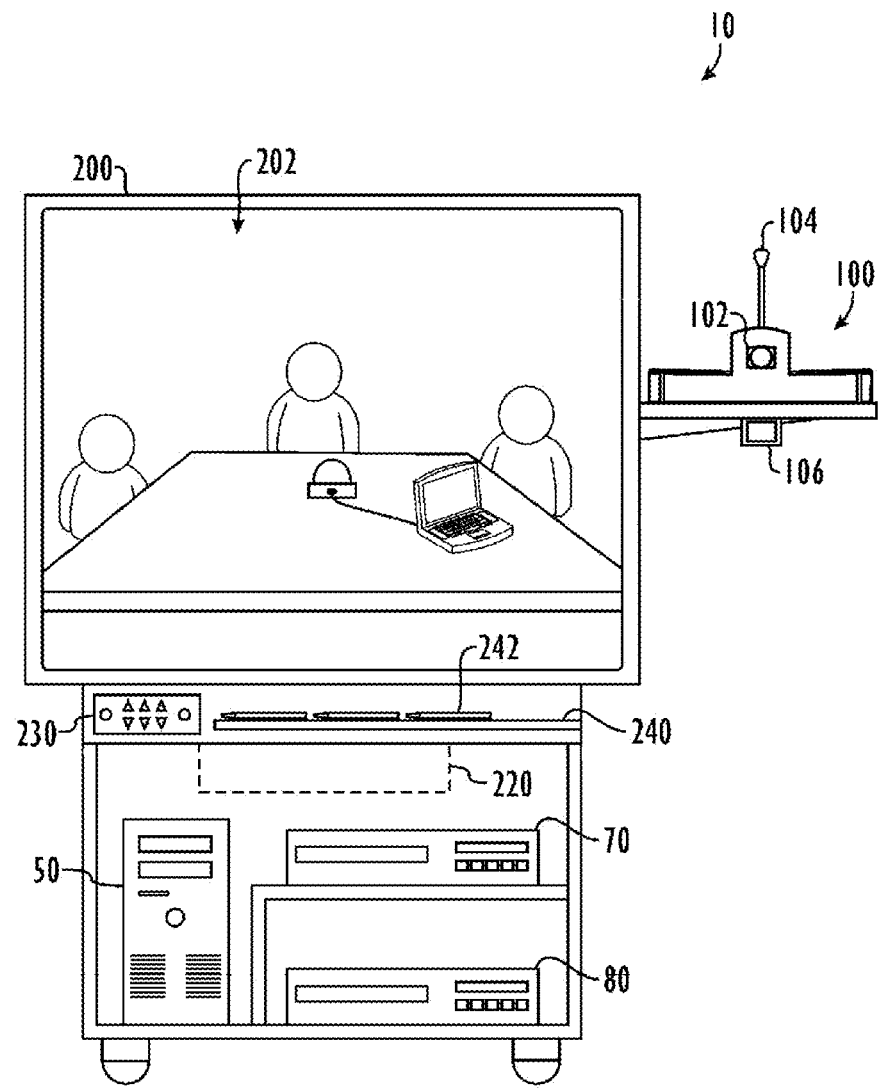
FIG. 2 illustrates an embodiment of a videoconferencing system according to certain teachings of the present disclosure.

Referring first to FIG. 2, an embodiment of a videoconferencing system 10 according to certain teachings of the present disclosure includes a videoconferencing unit 100 (similar to that described previously) and includes a touch screen display device 200. The videoconferencing system 10 can further include one or more peripheral devices, such as a computer (either laptop or desktop) 50, a Video Cassette Recorder (VCR) 70, and a Digital Versatile Disc (DVD) player 80. In one embodiment, the videoconferencing unit 100 is a VSX 8000 available from Polycom, Inc., the Assignee of the present disclosure, and the touch screen display device 200 is a 3000i model SMART Board available from SMART Technologies of Canada. In an alternative embodiment, the videoconferencing unit 100 and the touch screen display device 200 can be integrated together for the videoconferencing system 10.

The videoconferencing unit 100 can establish and conduct a videoconference with remote endpoints (not shown) via a network. The videoconferencing unit 100 has a camera 102 and a microphone 104. Depending on the implementation, the unit 100 can have other common components, such as an Infrared (IR) detector 106.

In this embodiment, the touch screen display device 200 is capable of both displaying video to the user and receiving touch and annotations from the user so that the display device 200 incorporates features of input and display for the videoconferencing system 10 as described previously. In one embodiment, the touch screen display device 200 is a video monitor or the like having optical sensors surrounding the screen 202 for detecting when a user touches or writes on an area of the screen 202. For example, the video monitor can be part of a conventional Television display, a flat panel display, or other display known in the art. The touch screen display device 200 can also use other touch screen technologies known in the art.

As the 3000i model SMART Board, the device 200 includes a projection screen 202, an integrated Extended Graphics Array (XGA) projector 220, a control panel 230, and a tray 240. The device 200 also includes an audio system (not shown). As described later, the display device 200 can have one or more sensors for detecting user movement for controlling operation of the display device 200, the videoconferencing unit 100, and/or other components. To detect when a user touches the screen 202, for example, the device 200 uses digital cameras (not shown) to detect objects and movement relative to the display screen 202, although other touch sensitive mechanisms known in the art can be used.

In addition to the sensor of the touch panel of the device 220, the control panel 230 of the display device 200 can include at least one sensor configured to operate in conjunction with the videoconferencing unit 100. For example, the sensor on the panel 230 can include one or more touch sensitive buttons. Moreover, the tray 240 can have various tools 242, such as pens and erasers. One or more sensors (not shown) on the tray 240 (such as optical sensors, proximity sensors, or other sensors) can produce sensor responses that detect when a user moves (i.e., picks up or replaces) a certain pen or eraser tool 242 from the tray 240. Regardless of the type of sensor and user movement detected, an indication from the sensor can be used by the system 10 to control operation as described herein.

Figure 3A:
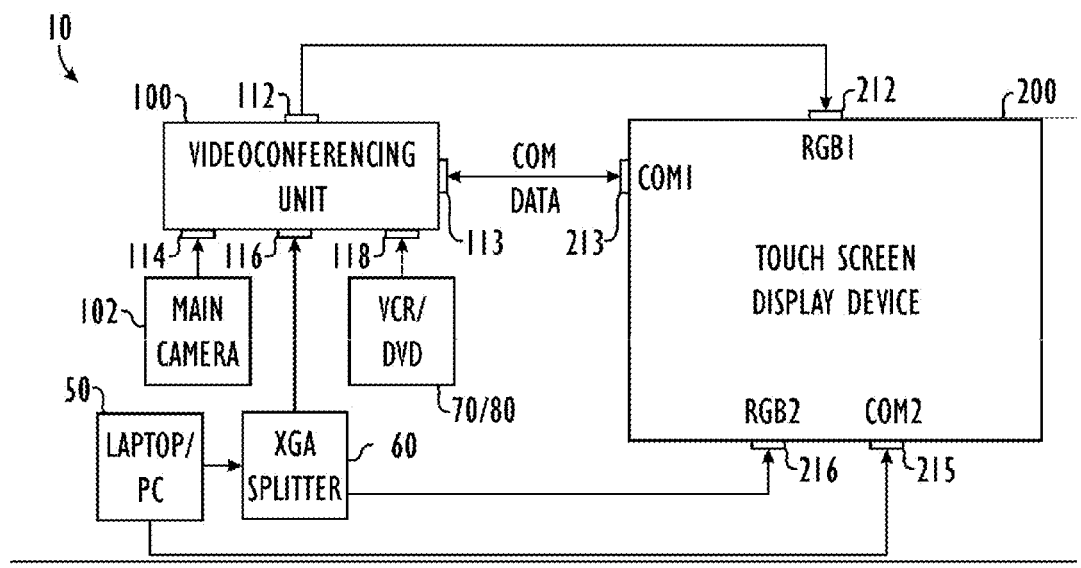
FIG. 3A illustrates a schematic diagram of an embodiment of the videoconferencing system.
Figure 3B:
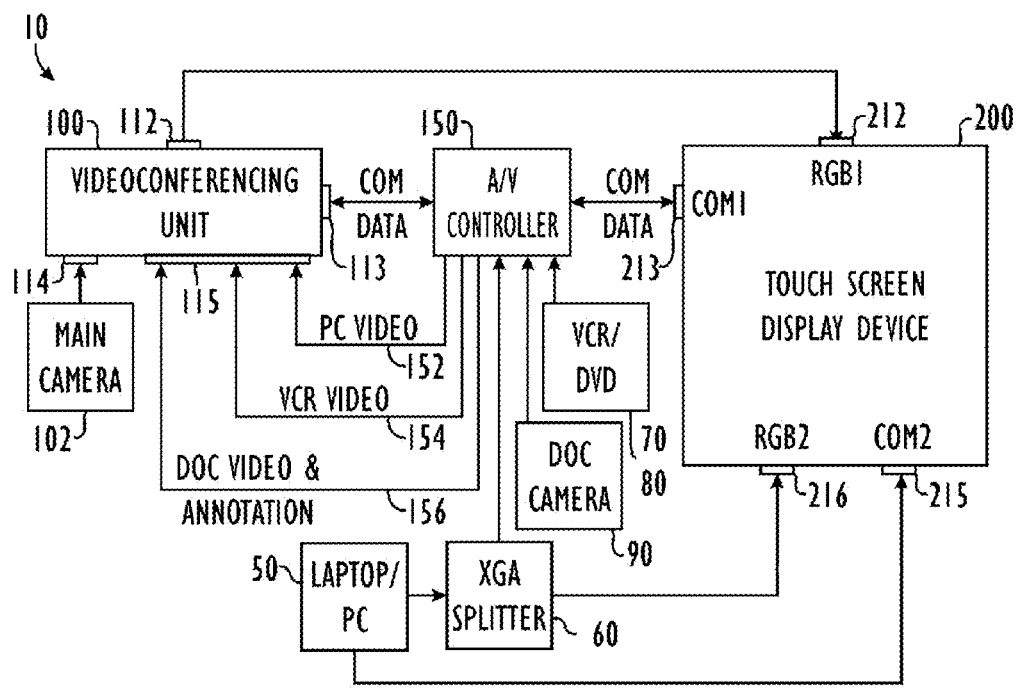
FIG. 3B illustrates a schematic diagram of another embodiment of the videoconferencing system.

Referring to FIGS. 3A and 3B, schematic diagrams of embodiments of the videoconferencing system 10 of FIG. 2 are illustrated. In the embodiment of FIG. 3A, the videoconferencing unit 100 of the system 10 is coupled directly to the touch screen display device 200. The discussion that follows focuses on video connections for the videoconference system 10. However, it will be appreciated that the videoconferencing system 10 can also have audio connections. For example, the videoconferencing unit 100 can have audio connections to the display device 200 and can send audio data to speakers of the display device 200.

With respect to video connections of the system 10, a camera 102 couples to an input 114, such as an S-video connection, of the unit 100. The videoconferencing unit 100 has a video output 112 that couples to a video input 212 of the display device 200. For example, an XGA cable can be used to connect an XGA output 112 of the unit 100 to an RGB input 212 of the display device 200. The videoconferencing unit 100 also has a serial port 113 that couples to a serial port (COM1) 213 of the display device 200. The unit 100 and the display device 200 transfer data between one another using the serial ports 113 and 213. This data includes touch data obtained by the display device 200 and transferred to the unit 100, which uses the touch data for operation as discussed below. The transferred data also includes data generated by a user selecting a configured button on the control panel (not shown) of the display device 200.

The videoconferencing system 10 can also include a number of optional components useful for some implementations or functions of the system 10. For example, one or more optional VCRs or DVD players 70 or 80 can couple to one or more inputs 118 of the unit 100. In addition, an optional laptop or other computer 50 can couple to the touch screen device 200 though a serial port (COM2) 215. The coupling of the computer 50 to the serial port (COM2) 215 of the device 200 can allow the display device 200 to operate separately as an independent component from the videoconferencing unit 100—if the computer 50 has appropriate software.

The computer 50 can also couple to an Extended Graphics Array (XGA) Splitter 60 that couples to an input 116 of the videoconferencing unit 100 and couples to an RGB input 216 of the display device 200. The coupling of the computer 50 and splitter 60 to both the unit 100 and the device 200 allows the computer 50 to provide content, images, etc. on the computer to be displayed by the device 200 and to be manipulated and forwarded to remote endpoints (not shown) by the videoconferencing unit 100. In one embodiment, the computer 50 can have a graphical user interface for controlling operation of the videoconferencing unit 100—if the computer 50 has appropriate software integrating the computer 50 with the unit 100. The GUI for controlling the unit 100 with the computer 50 can be displayed on the display device 200 when operated in a "PC direct" mode of operation discussed below.

In the embodiment of the videoconferencing system 10 in FIG. 3B, the videoconferencing unit 100 again has its video output 112 directly coupled to the RGB input 212 of the display device 200. However, the serial port 113 of the unit 100 couples to an A/V controller 150 that in turn couples to the serial port (COM 1) 213 of the display device 200. Using the A/V controller 150, the unit 100 and the device 200 can transfer data between one another using the serial ports 113 and 213.

In one embodiment, the A/V controller 150 is a POINTMAKER® PVI video marker, which is a programmable device that is used to control audio and visual devices and is available from Boeckeler Instruments, Inc. of Tucson, Ariz. The serial connection of the videoconferencing unit 100 to the A/V controller 150 via serial port 113 allows the unit 100 to control operation of the A/V controller 150.

As in the previous embodiment, the camera 102 couples directly to the camera input 114 of the unit 100. However, optional components, such as the VCR/DVD 70/80, a document camera 90, the computer 50, and the XGA splitter 60, are coupled to the A/V controller 150. In turn, the A/V controller 150 provides first video data 152 from the personal computer 50, second video data 154 from the VCR/DVD 70/80, and third video data 156 from the document camera 90 to one or more inputs 115 of the videoconferencing unit 100.

In the present embodiment, the document camera 90 can connect by an S-video cable to an S-video input of the A/V controller 150. In turn, an S-video cable from an S-video output of the A/V controller 150 can connect to a second camera input of the unit 100. The VCR/DVD 70/80 can connect by an RCA or BNC cable from a composite video output of the VCR/DVD 70/80 to a composite video input of the A/V controller 150. In turn, a BNC or S-video cable from a composite video output of the A/V controller 150 can connect to a VCR/DVD video input of the videoconferencing unit 100. The video from the A/V controller 150 can connect by a XGA/VGA cable from a VGA output of the A/V controller 150 to a VGA input of the videoconferencing unit 100.

Figure 4:
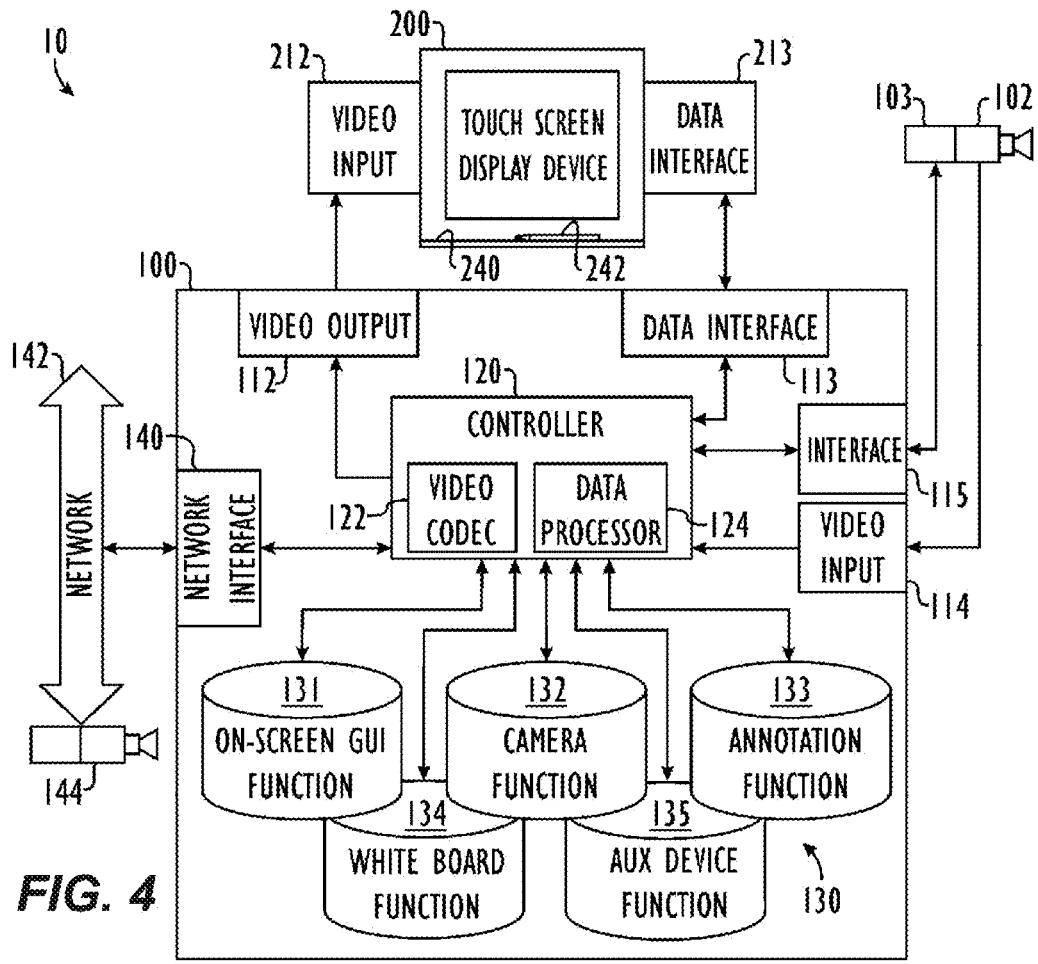
FIG. 4 schematically illustrates components of the videoconferencing unit.

Referring now to FIG. 4, additional components of the videoconferencing system 10 are schematically illustrated in more detail. As shown, the videoconferencing unit 100 has a controller 120, which can include any conventional encoders, processors, and other electronic components known in the art and used for a videoconferencing unit. The controller 120 is coupled to the output 112 for video, the serial port 113 for data interface, and memory 130 storing functions 131-135. The controller 120 is also coupled to an input 114 for video from a near camera 102 and can be coupled to an interface 115 for controlling the near camera 102. The video output 112 is coupled to the video input 212 of the display device 200, and the serial port 113 exchanges data with a serial port 213 of the display device 200. For example, the serial port 113 receives touch data from the display device 200, the port 113 can exchange control data with the display device 200.

The controller 120 includes a video codec 122 and a data processor 124. The video codec 122 is responsible for processing video data to be displayed by the display device 200 and to be sent to remote endpoints of the videoconference. In general, the video data can include images captured by the camera (not shown) of the unit 100, video from remote endpoints of the videoconference, content from a peripheral device (e.g., VCR, DVD player, computer, document camera, etc.), annotations from the display device 200, and other visual data. Operation of such a video codec 122 in the context of videoconferencing is well known in the art is not described herein.

The data processor 124 is responsible for processing data for the videoconferencing unit 100. This data includes touch data from the display device 200, communication data, commands, videoconference information, etc. The controller 120 is also coupled to a network interface 140, such as commonly used for a videoconferencing unit, and the network interface 150 couples to a videoconference network 142 known in the art.

The controller 120 controls operation of at least some features of the videoconferencing system 10 using the operational functions 131-135 stored in memory 130. These operational functions include an on-screen graphical user interface (GUI) function 131, a camera function 132, an annotation function 133, a white board function 134, and an auxiliary device function 135. Each of these operational functions 131-135 is discussed in more detail later, but a general overview of these functions 131-135 is provided here.

The on-screen GUI function 131 allows the videoconferencing unit 100 to display graphical user interfaces for controlling operation of the system 10 on the display device 200. The graphical user interfaces of the videoconference unit 100 can include a number of touch controls, menus, and dialogs that can be displayed on the display device 200 for a user to operate and control the system 10. For example, the graphical user interfaces of the unit 100 can allow the user to place a videoconference call through a directory, speed dial, or manual dial menu; answer an incoming videoconference call; hang-up a videoconference call; mute or change volume of audio; select camera and content sources, swap near and far video in picture-in-picture (PIP), and other operations disclosed herein. A number of touch panel menus and screens for a GUI are discussed below with reference to FIGS. 6 and 11A-22, for example.

The camera function 132 allows the videoconferencing unit 100 to display visual touch controls on the display device 200 for controlling operation of one or more cameras, such as near camera 102. A number of touch panel menus and screens for camera control are discussed below with reference to FIGS. 7 and 13A-13C. In one embodiment, the near camera 102 is a pan-tilt-zoom camera capable of panning, tilting, and zooming. One or more of the panning, tilting, and zooming capabilities of the near camera 102 can be accomplished by one or more mechanical actuators 103, as are used in the art for operating pan-tilt-zoom cameras of videoconferencing units. The interface 115 is coupled to the actuator 103, and the controller 120 controls operation of the panning, tilting, and zooming capabilities of the near camera 102 using control signals via the interface 115. A user utilizing visual touch controls on the display device 200 can generate the control signals to control the panning, tilting, and zooming of the near camera 102.

Alternatively, the panning, tilting, and zooming capabilities of the near camera 102 may be electronically achieved. For example, the near camera 102 may have processing capabilities for panning, tilting, and/or zooming, and the controller 120 can control that processing using control signals via the interface 115. In another example, the controller 120 may instead having the processing capabilities for panning, tilting, and/or zooming, and the controller 120 can perform those operation based on video received from the near camera 102 via video input 114.

In addition to controlling the near camera 102, the camera function 132 allows the videoconferencing unit 100 to display visual touch controls on the display device 200 for controlling operation of a far-end camera 144 on the network 142. For example, the far-end camera 144 may be associated with a remote endpoint participating in the videoconference. Using the network interface 140, the controller can control the panning, tilting, and zooming capabilities of the far-end camera 144 using control signals. For example, the far-end camera 144 can be a pan-tilt-zoom camera having one or more mechanical actuators or having electronic processing capabilities. The controller 120 can use a far-end camera control protocol, such as H.224 that is described in Annex Q of H.323, for controlling the far-end camera 144 via the network interface 140.

The annotation function 133 allows the user to make annotations on video displayed on the display device 200, and the white board function 134 allows the user to make annotations on a white board displayed on the display device 200. A number of touch panel menus and screens for annotation and whiteboard are discussed below with reference to FIGS. 8-9 and 22. Finally, the auxiliary device function 135 allows the videoconferencing unit 100 to display video from other auxiliary devices, such as a computer, laptop, VCR, DVD player, etc. A number of touch panel menus and screens for source selection are discussed below with reference to FIGS. 8-9 and 14-16C.

As will be apparent from the general description above, the operational functions 131-135 allow the videoconferencing unit 100 to operate the touch screen display device 200 in FIG. 2 in an annotation mode and in a touch control mode. Determination of which mode can depend on whether a pen or eraser tool 242 is picked up from the tray 240 of the display device 200. If a pen or eraser tool 242 is lifted off the tray 240, for example, the videoconferencing unit 100 can operate the display device 200 in the annotation mode so that the user can make annotations on video displayed on the device 200. The video can be of the videoconference or other content and can be from the videoconferencing unit 100, computer, laptop, VCR, DVD player, document camera, etc. When all of the tools 242 are placed in the tray 240, the videoconferencing unit 100 can operate the display device 200 in the touch control mode so that the user can control operation of the videoconference system 10 by touching areas of the display 200 corresponding to the graphical user interfaces, touch controls, menus, dialogs, etc. of the unit 100.

Provided the general overview of how the videoconferencing unit 100 controls operation of the videoconferencing system 10, reference is now made to FIGS. 5 through 9 for a more detailed discussion of the operational functions of the videoconferencing unit 100.

Figure 5:
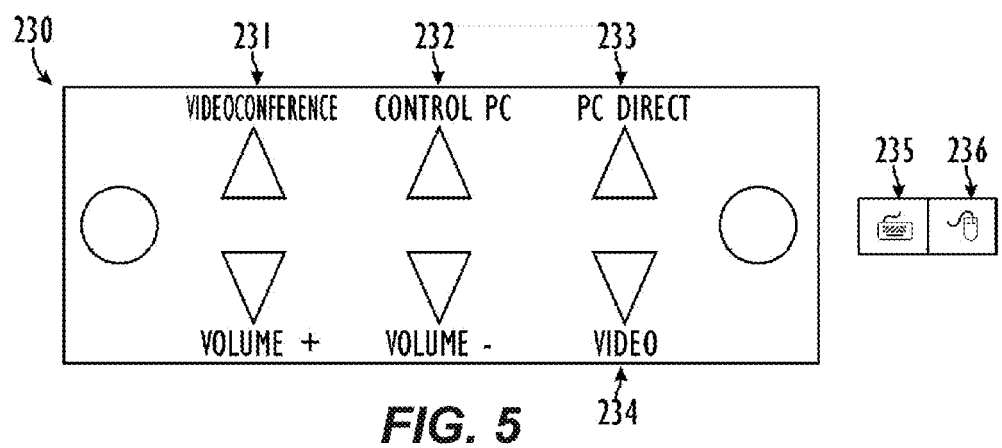
FIG. 5 illustrates an embodiment of a control panel of a touch screen display device.

As noted above, the videoconferencing unit 100 controls operation of the touch screen display device 200 using the auxiliary device function 135. One way for achieving this is accomplished by integrating controls on the control panel (230; FIG. 2) of the display device 200 with the videoconferencing unit 100. Referring to FIG. 5, an embodiment of the control panel 230 of the touch screen display device (not shown) is illustrated. As discussed previously, the touch screen display device is preferably a 3000i model SMART Board. As such, the control panel 230 of the 3000i model SMART Board has a plurality of buttons that are configured to control volume levels, brightness levels, and contrast levels of the display device. As part of the integration between the videoconferencing unit (100) and the display device (200) of the disclosed videoconferencing system (10), however, the buttons on the control panel 230 of the display device are reconfigured as illustrated in the embodiment of FIG. 5. (For convenience, reference is concurrently made in FIG. 5 to reference numerals for components in FIG. 2 of the present disclosure).

The control panel 230 includes a first button 231 configured to initiate a videoconference mode of operation. In this mode, the videoconferencing unit (100) establishes and conducts a videoconference by establishing a videoconference connection with remote endpoints via a network, by sending video of the videoconference to the RGB input of the display device (200), and by transferring graphical user interfaces and touch data between the display device (200) and the unit (100).

A second button 232 of the panel 230 is configured to initiate control of a personal computer (50) if coupled to the disclosed videoconferencing system. In this mode, content from the computer (50) can be shown during the videoconference. This content can include screens of the computer, video, or other images stored on the computer, PowerPoint presentations, files, etc. During a videoconference, the content from the computer (50) is processed by the videoconferencing unit (10) and is sent to the display device (200). The content can also be sent to remote endpoints of the videoconference.

A third button 233 of the panel 230 is configured to initiate a PC direct mode of operation. In this mode, video data from the computer (50) is sent to the RGB input of the display device (200) directly from the XGA output from the splitter (60) rather than from the video codec of the videoconferencing unit (100). This could be done whether in a videoconference call or not or can be done whether computer's content is sent to other endpoints or not. A fourth button 234 of the panel 230 is configured to initiate a video mode of operation in which the display device (200) is operated to receive video by an S-Video connection from a connected source.

In addition to the buttons on the control panel 230, the display device (200) also includes other buttons 235 and 236 on the device's tray (240). These buttons 235 and 236 are shown in FIG. 5 apart from the tray (240) for convenience.

The first tray button 235 is originally configured to access an on-screen keyboard on the screen of the display device (200) when operated with software of a coupled computer or laptop. For the videoconferencing system (10) of the present disclosure, however, pressing this keyboard button 235 is reconfigured to access an on-screen keyboard of the videoconferencing unit (100) if all the pens (242) on the tray (240) of the display device (200) are down and if the unit (100) is generating a screen where display of the keyboard is appropriate. If a pen (242) is lifted from the tray (240), however, this button 235 is configured to access a calibration screen of the A/V controller (150; FIG. 3A) if it is a component of the implementation of the videoconferencing system (10). With the accessed calibration screen, the user can calibrate the A/V controller (150; FIG. 3B) using the touch screen display device (200).

The second tray button 236 is originally configured to operate as a right-mouse click when the display device (200) is operated with software of a coupled computer or laptop (50). For the videoconferencing system (10) of the present disclosure, however, pressing this button 236 is reconfigured to start and stop VGA graphics of the videoconferencing unit (100) if the pens (242) on the tray (240) of the display device (200) are down. If a pen (242) is lifted from the tray (240), this button 236 is configured to access a menu of the A/V controller (150; FIG. 3B) if it is part of the implementation. With the accessed menu screen, the user can control operation of the A/V controller (150; FIG. 3B) using the touch screen display device (200).

Returning briefly to FIG. 4, the videoconferencing unit 100 has an on-screen GUI function 131, as previously discussed, for displaying user interfaces, menus, touch controls, dialogs, etc. on the display device 200 used to control operation of the system 10. Part of the on-screen GUI function 131 involves displaying touch controls on the display device 200 and receiving touch data at the videoconferencing unit 100 from the display device 200 with respect to those touch controls to control operation of the system 10. In other words, the display device 200 is used to detect information, selections, annotation from a user's touch, electronic pen, etc. on the touch screen display device 200. This detected touch data is sent to the videoconferencing unit 100. In turn, the touch data is used to operate the videoconferencing system 10.

For example, a touch or release in an area of the touch screen of the display device 200 causes an event that corresponds to the touch and/or release of a feature configured for the user interface of the videoconferencing unit 100. If the user's touch is on an area of the screen that is not designated as a touch control of the user interface of the unit 100, then the touch data may be processed by a supervisory algorithm that can access camera controls or bring up a main menu or the like. Accordingly, the unit 100 determines whether a graphical user interface (GUI) and/or video is currently being displayed on the display device 200. If the unit 100 is showing a GUI, for example, then the user will be able to use a finger or electronic pen 242 to touch the screen of the display device 200 and produce inputs to the videoconferencing unit 100. In turn, these sensor responses of the display device 200 from the finger or pen 242 can be used for the various purposes disclosed herein.

Figure 6:
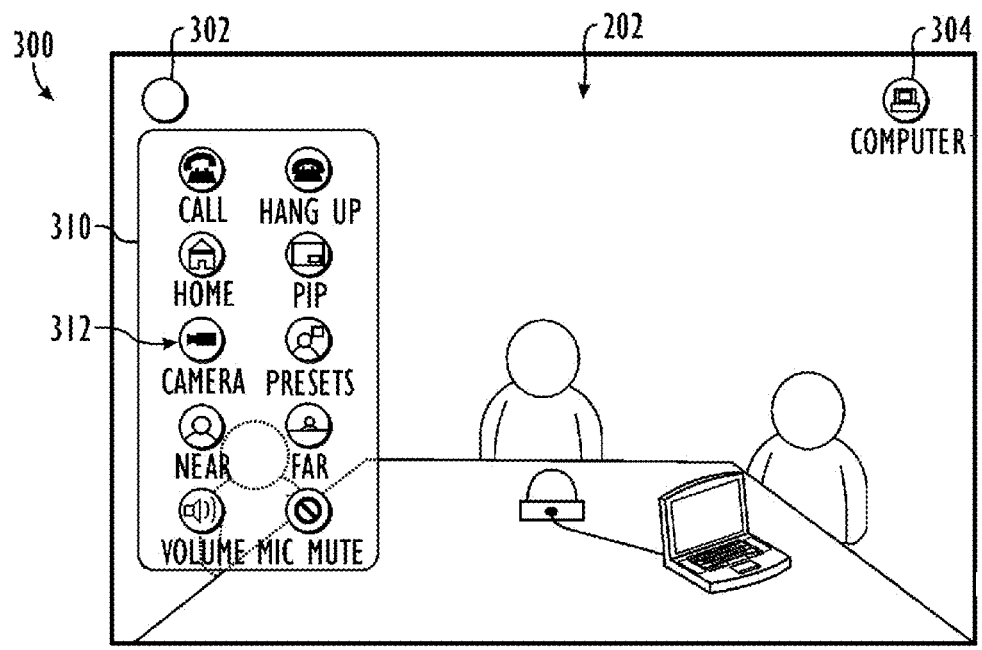
FIG. 6 illustrates an embodiment of a menu function of the videoconferencing system.

Referring to FIG. 6, an embodiment of a menu 310 generated by the videoconferencing unit (100) is illustrated on the touch screen 202 of the display device (200). The menu 310 can be invoked when the user selects a button 302 displayed on the top left of the screen 202 while video is being displayed. Preferably, the button 302 is transparent or hidden and is available from all screens including those containing video of participants and content. Once invoked, the menu 310 allows the user to control the videoconferencing system by using interactive touch directly on the screen 202. Preferably, the menu 310 is transparent and displayed over video currently displayed on the screen 202.

The menu 310 includes a plurality of touch controls 312 similar to a buttons available on a remote control. These touch controls 312 include a Home button, a Call button, a Hang-Up button, a Volume button, a Mute button, a Cameras button, a picture-in-picture (PIP) button, a Near button, a Far button, a Preset button, and a Close button. These and other buttons may be provided in the menu 310 depending on the implementation. For example, some other possible buttons include buttons for bringing up help and buttons for an on-screen keyboard.

The touch controls 312 can operate similar to corresponding controls found on a physical remote. Here, the difference is that designated areas of the video data displayed on the screen 202 are associated with touch controls used to control and operate the videoconferencing system. For example, selecting the Call button on the menu 310 can initiate a videoconference call. To initiate the call, a Speed Dial dialog or an address book dialog may be accessed on the screen 202 to select with which remote endpoints to establish the videoconference. Selecting the Hang-up button on the menu 310 can end a videoconference call or can bring up a hang-up dialog on the screen 202 if there is more than one call currently active. Selecting the Volume button on the menu 310 can bring up a volume bar on the screen 202, and then user can touch on the Volume bar displayed on the screen 202 to control the volume. The Mute and PIP on the menu 310 can be toggling buttons for muting the audio and producing picture-in-picture on the screen 202.

Selecting the Preset button on the menu 310 can bring up a Preset dialog on the screen 202, and the user can select from a plurality of stored presets or touch and hold to store a preset. Selecting the camera button on the menu 310 can bring up a dialog on the screen 202 that lists video sources (e.g., camera, computer, etc.), and the user can touch on an appropriate button on the list to select a desired video source. The near and far buttons on the menu 310 allows the user to select and control the near camera (i.e., the one coupled to the videoconferencing unit (100)) or one or more of the far cameras associated with the endpoints of the videoconference.

Although FIG. 5 shows the menu 310 having several touch controls 312 overlaying displayed content on the screen 202, other menu arrangements and controls can be used. For example, several menu screens may be used with distinctive control items on each screen to facilitate use of the menus by a user. Moreover, the menus may be displayed on the screen 202 independently of any content from other sources. A number of menus and screens for user interface features of the present disclosure are discussed in detail with reference to FIGS. 11A through 22 below.

As discussed previously, the videoconferencing unit 100 of FIG. 4 also has the camera function 132 for controlling the camera. Part of the camera function 132 involves displaying camera controls on the display device 200 and receiving touch data from a user with respect to those camera controls to control operation of the camera.

Figure 7:
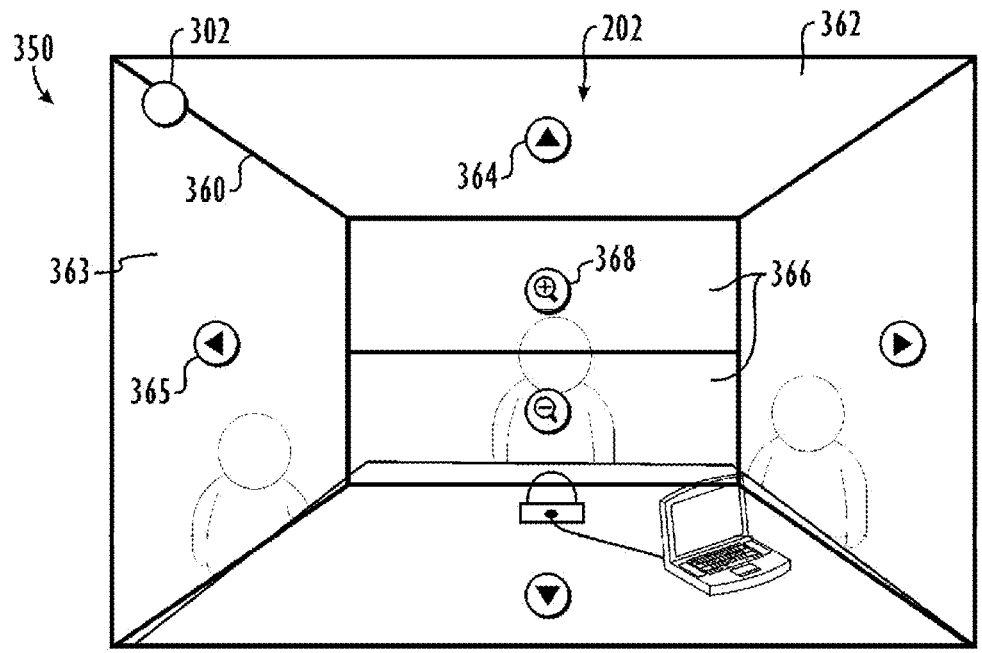
FIG. 7 illustrates an embodiment of a camera function of the videoconferencing system.

Referring to FIG. 7, an embodiment of camera controls 350 generated by the videoconferencing unit (10) is illustrated on the touch screen 202 of the display device (200). The camera controls 350 allow the user to control a pan-tilt-zoom camera using intuitive touch on the screen 202. When full screen video is being displayed on the screen 202, then touching anywhere on the screen while the pens or eraser tools (242; FIG. 1) are down will bring up a watermark grid 360 displayed over the active video. Control icons 364 and 368 are positioned in areas 362 and 366 of the watermark grid 360. By touching in a pair of upper and lower areas 362 of the grid 360 associated with the control icons 364, the user can tilt the tilt-pan-zoom camera of the connected videoconferencing unit or of a remote endpoint participating in the videoconference. By touching in a pair of right and left areas 363 of the grid 360 associated with the control icons 365, the user can pan the tilt-pan-zoom camera of the connected videoconferencing unit or of a remote endpoint participating in the videoconference. By touching in the pair of inside areas 366 of the grid 360 associated with the other control icons 368, the user can zoom the camera of the connected videoconferencing unit or of a remote endpoint participating in the videoconference.

Determining which camera (e.g., near or far-end) associated with the videoconference is controlled can depend on which video is currently being displayed on the screen 202. For example, if video of a far-end camera associated with an endpoint of the videoconference is currently displayed on the screen 202, then touching the areas 362, 363, and 366 associated with the grid 360 will control the pan, tilt, and zoom of the far-end camera using the techniques disclosed herein. If video of the near camera connected to the videoconferencing unit associated with the screen 202 is currently being displayed, then touching the areas 362, 363, and 366 associated with the grid 360 will control the pan, tilt, and zoom of the near camera using the techniques disclosed herein.

Figure 8:
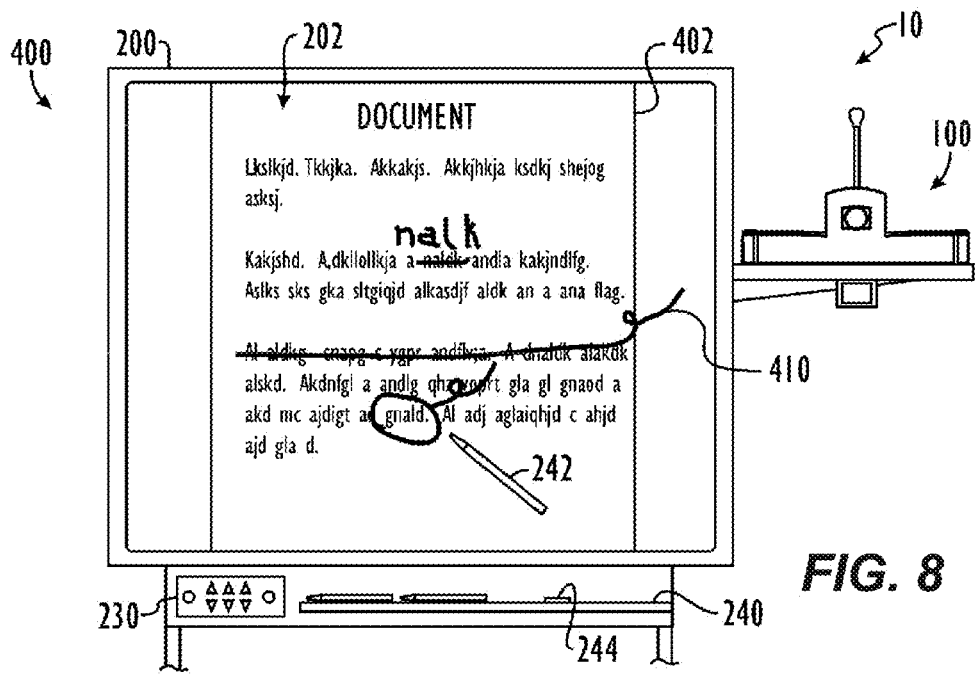
FIG. 8 illustrates an embodiment of an annotation function of the videoconferencing system.

As discussed previously, the videoconferencing unit 100 of FIG. 4 has the annotation function 133 for adding annotations to displayed video. Referring to FIG. 8, portion of the videoconferencing system 10 is shown operating in an annotation mode 400. In the annotation mode 400, a user can make annotations 410 over video currently displayed on the screen 202. The annotations 410 can be made with an electronic pen 242 or finger and can be made while either on or off an active videoconference call. If the user wants to write on a displayed object 402 (e.g., a displayed document from a connected document camera or a computer) on the screen 202, then the videoconferencing system 10 automatically goes into the annotation mode 400 of operation as soon as the user picks up the electronic pen 242 from the tray 240. As discussed previously, sensors 244 (e.g., optical sensors) on the tray 240 of the display device 200 can be used to detect user movement when the user picks up or replaces the pen 242 on the tray 240. This data is sent from the display device 200 through the data interface with the videoconferencing unit 100 where the controller (120; FIG. 4) of the unit 100 access the annotation function (133; FIG. 4). Replacing the pen (242) may stop the annotation mode or revert the displayed content to a previous state.

In the annotation mode, the user is able to make annotations 410 on various video or images displayed on the screen 202 of the display device 200. The video and images can include videoconference video from the videoconferencing unit 100, video from a document camera, video from a VCR or DVD player, or a computer screen image from a connected computer. The video from the document camera, VCR, and DVD player can comply with the National Television Standards Committee (NTSC) or Phase Alternating Line (PAL) standards. The computer screen image can be XGA having a resolution of 1024×768.

When annotations 410 are made on the screen 202, the graphical elements of the annotations 410 are combined with the displayed video. By combining the annotations 410 with the displayed video, the annotations 410 can be readily sent to far endpoints of the videoconference as part of the compressed video bit stream sent from the unit 100 to remote endpoints over the videoconference network.

In one embodiment, the user can make annotations 410 to content provided by the computer (50) by preferably, annotating content from the computer (50). The content can be of a whiteboard, a computer screen, an image, or visual media from the computer. For example, the computer (50; FIGS. 3A-3B) can be designated as the source of content for display on the screen 202 of touch screen device 200. During a videoconference, the user can pick up a user tool 242 from the tray 240 of the touch screen device 200, and the videoconferencing system 10 automatically switches to the annotation mode of operation. Once in the annotation mode of operation, the computer (50) receive touch data from the touch screen device 200 and combines the received touch data as annotation to the computer's content. The computer (50) sends this annotated content to the touch screen device 200 for display and sends it to the videoconferencing unit 100. In turn, the videoconferencing unit 100 receives the annotated content from the computer (50) and sends the received annotated content to the endpoints (not shown) of the videoconference via the unit's network interface (140; FIG. 4). Thus, annotations can be made to content and sent automatically to far-end endpoints via the network.

Sending the annotated content preferably involves combining the annotation data and content data together so that the combination can be sent in the H.239 standard through the network. Furthermore, handling annotations and content for display on the touch screen device 200 with the computer (50) can avoid issues with delay that conventionally occur when a user makes annotations during a videoconference. Specifically, handling annotations and content with the computer (50) avoids the need of having the videoconferencing unit 100 handle the annotations and content and send that annotated content to the touch screen device 200 for display. Such a feedback arrangement typically results in a delay between what annotations the user is currently making on the screen 202 of the display device 200 and how much of the annotation 410 is being displayed. Any significant delay is generally undesirable.

Figure 9:
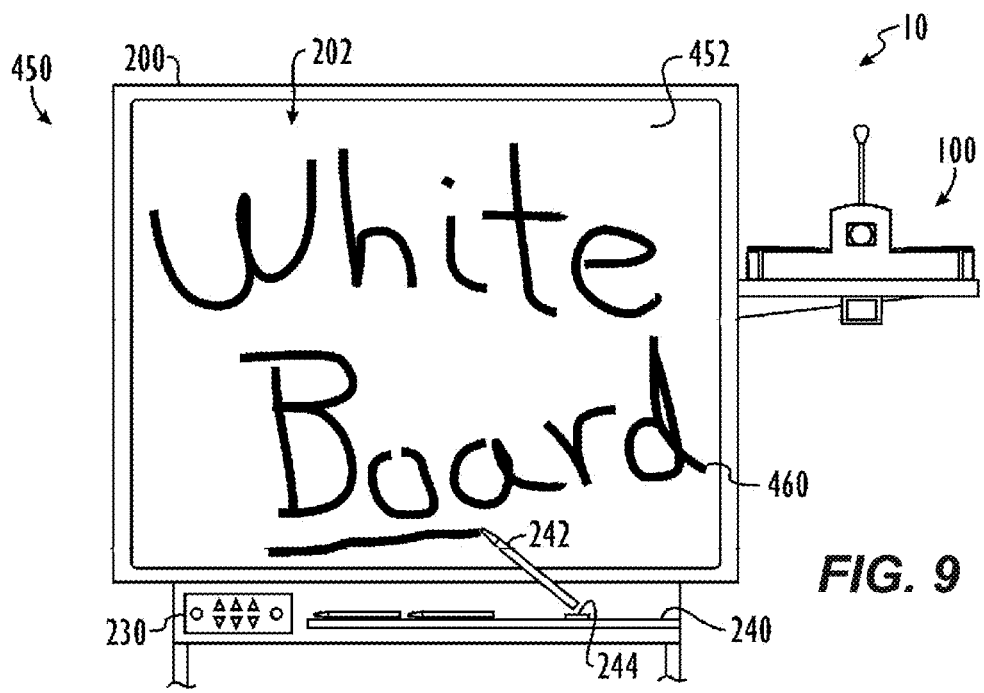
FIG. 9 illustrates an embodiment of a whiteboard function of the videoconferencing system.

As discussed above, the videoconferencing unit 100 of FIG. 4 also has the whiteboard function 134 for allowing the display device 200 to be used as a whiteboard. Referring to FIG. 9, portion of the videoconferencing system 10 is shown operating in a whiteboard mode 450. To access this mode 450, a user can pick up an electronic pen 242 from the tray 240 of the display device 200 or access some other control, and the videoconferencing system 10 automatically goes into the whiteboard mode 450 of operation if another source of video (e.g., document camera, computer, VCR, DVD player, etc.) is not already selected. The user can then start writing annotations 460 on the whiteboard content 452 displayed on the screen 202. The whiteboard content 452 is preferably an XGA image having a resolution of 1024×768. The user can make annotations 460 on the whiteboard content 452 regardless of whether the system 10 is in a videoconference call or not. When in a videoconference call, however, the whiteboards content 452 with the annotations 460 can be sent to remote endpoints by the videoconferencing unit 100.

As discussed previously with reference to FIGS. 3A-3B, the system 10 may not include a computer. Lacking a computer, the videoconferencing unit 100 can generate a whiteboard on its own. When the system 10 is currently displaying video data of a graphical user interface or the camera on the display device 200, the videoconferencing unit 100 automatically goes into the annotation mode of operation when the user picks up the pen 242 from the tray 240. In the annotation mode, the videoconferencing unit 100 generates the whiteboard content 452. The videoconferencing unit 100 receives touch data from the display device (200) and combines the touch data as annotations 460 to the whiteboard content 452. The videoconferencing unit 100 then sends the annotated whiteboard to the display device 200 and sends it to one or more remote endpoints of the videoconference as H.239 content. In an alternative embodiment, however, the system 10 can use an optional computer (50; FIGS. 3A-3B) to handle the whiteboard content 452 and the annotations 460 so that the videoconferencing unit 100 can send the annotated whiteboard to the one or more remote endpoints of the videoconference as H.239 content.

As noted previously, an optional computer (50; FIGS. 3A-3B) can connected to the system 10. Picking up a pen 242 from the tray 240 can cause the system 10 to pick a VGA or video source automatically for displaying full screen on the display device 200 and/or for sending to remote endpoints of the videoconference. For example, rather than showing the whiteboard 452 as the background of the display screen 202, a computer screen from the optionally connected computer (50) can be shown. The choice of which VGA or video source depends on which sources are currently selected for the system 10. For example, behavior regarding video annotation can be controlled by the A/V controller 150 integrated with the system 10, and the A/V controller 150 can be configured to provide the features disclosed herein for annotating video and switching between sources.

Figure 10:
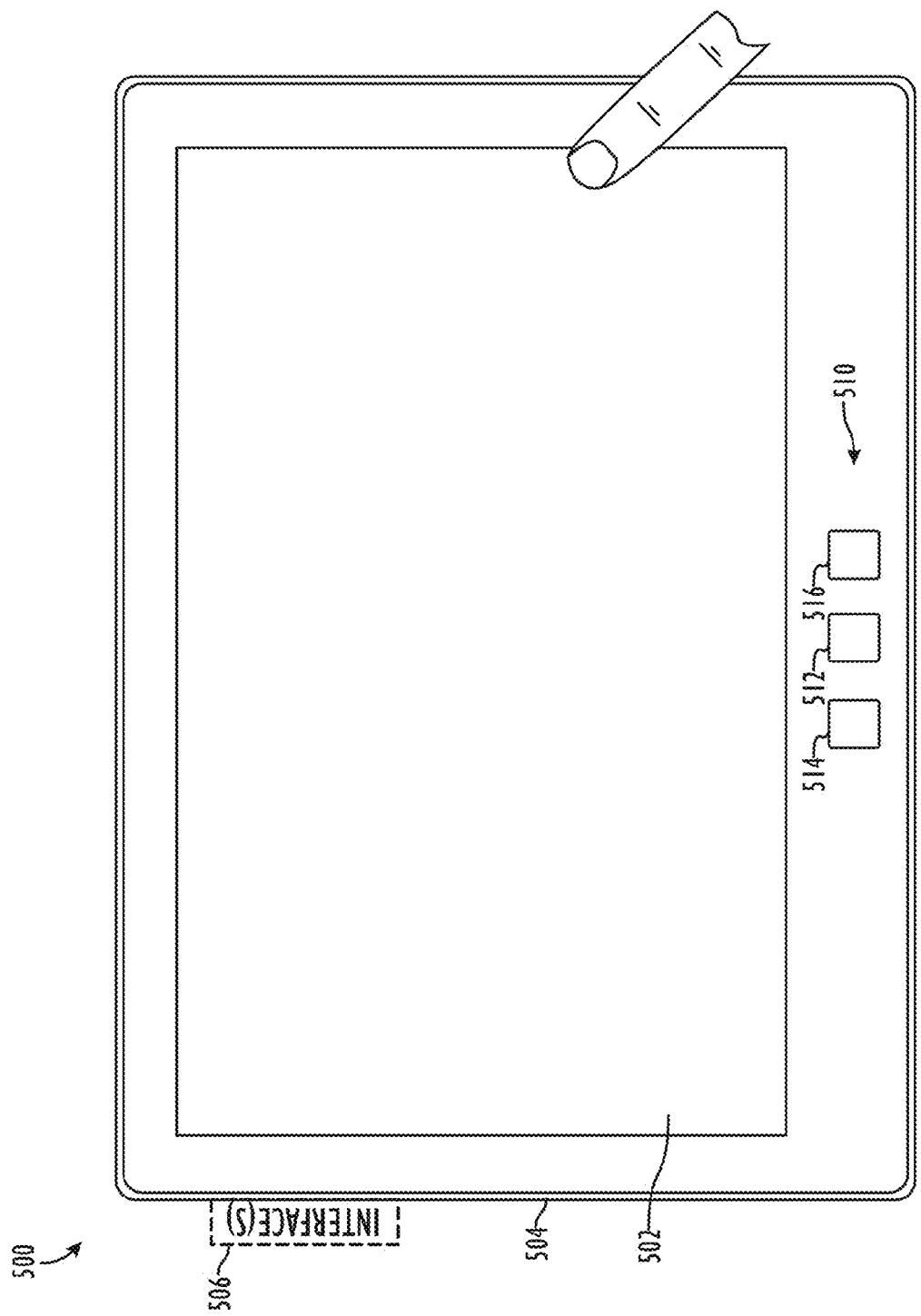
FIG. 10 shows a touch panel device that can implement a variety of the features described herein.

The touch screen display device 200 described above can be used by an operator to control the videoconferencing system 10 and to display videoconferencing content at the near-end. As mentioned previously with reference to FIG. 1, other forms of user interface devices can be used to control the videoconferencing unit 100 and optionally to display videoconferencing content. For example, FIG. 10 illustrates an embodiment of one such user interface device 500 incorporating various features of the present disclosure. The user interface device 500 couples to the videoconferencing unit (100) instead of or in addition to the previously described touch screen display device (200) or any other display (e.g., 160; FIG. 1) for the system 10. To that end, the user interface device 500 has an interface 506 that can interface with an appropriate input on the videoconferencing unit 110, such as a standard I/O port (Ethernet, USB, IEEE 1394, RS-232, IEEE 1284, etc.) or a proprietary interface. The user interface device 500 can also interface wirelessly, using Bluetooth, IR, WiFi, etc.

In this embodiment, the user interface device 500 is a touch screen controller or device having a touch screen panel 502, a surrounding bezel 504, and one or more buttons 510. The touch screen features of the panel 502 can be based on any of a variety of known touch sensing technologies, including capacitive, resistive, surface acoustic wave, frustrated total internal reflection, etc. The touch screen features may be implemented as a single-touch screen, in which only one contact point can be detected and tracked at any one time, or can be implemented as a multi-touch screen, in which multiple contact points can be detected and tracked. As will be appreciated by those skilled in the art, a multi-touch screen allows the use of more complex interactions such as multi-finger gestures, further enhancing the functionality of the touch screen.

The one or more buttons 510 can be of a variety of types, including momentary contact push buttons, virtual keys or touch-sensitive regions on the bezel 504 based on resistive, capacitive, or other touch sensing technologies, or other types of button-like interfaces known to those skilled in the art. In the illustrated embodiment, three buttons 510 are provided and include a home button 512, a back button 514, and an information/settings button 516. While the number of buttons 510 provided in the illustrated embodiment is believed to be particularly desirable from a user interface design perspective, in various embodiments, more or fewer buttons could also be provided as desired.

The home button 512 can be used for accessing or returning to a primary interface screen or "home menu." The back button 514 can be used for returning to a previously displayed screen, which, as will become apparent from the description below, can be a higher-level menu or interface screen, a lower level menu or interface screen, or a different page of the current menu level. Finally, the information/settings button 516 can be provided for accessing other menus or settings. Further details of the function of these interface buttons 510 will become apparent based on the following discussion.

Given the above details related to the touch screen devices 200 and 500, discussion now turns to various menus, screens, pages, selectable items, and other user interface features that can be displayed and selected by a user to control the videoconferencing system 10. Although these menus and other features are described with reference to the touch screen device 500 of FIG. 10, it will be appreciated that other touch screen devices, including the display device 200 of FIG. 2 described previously, can use and take advantage of the same menus and other features.

Figure 11A:
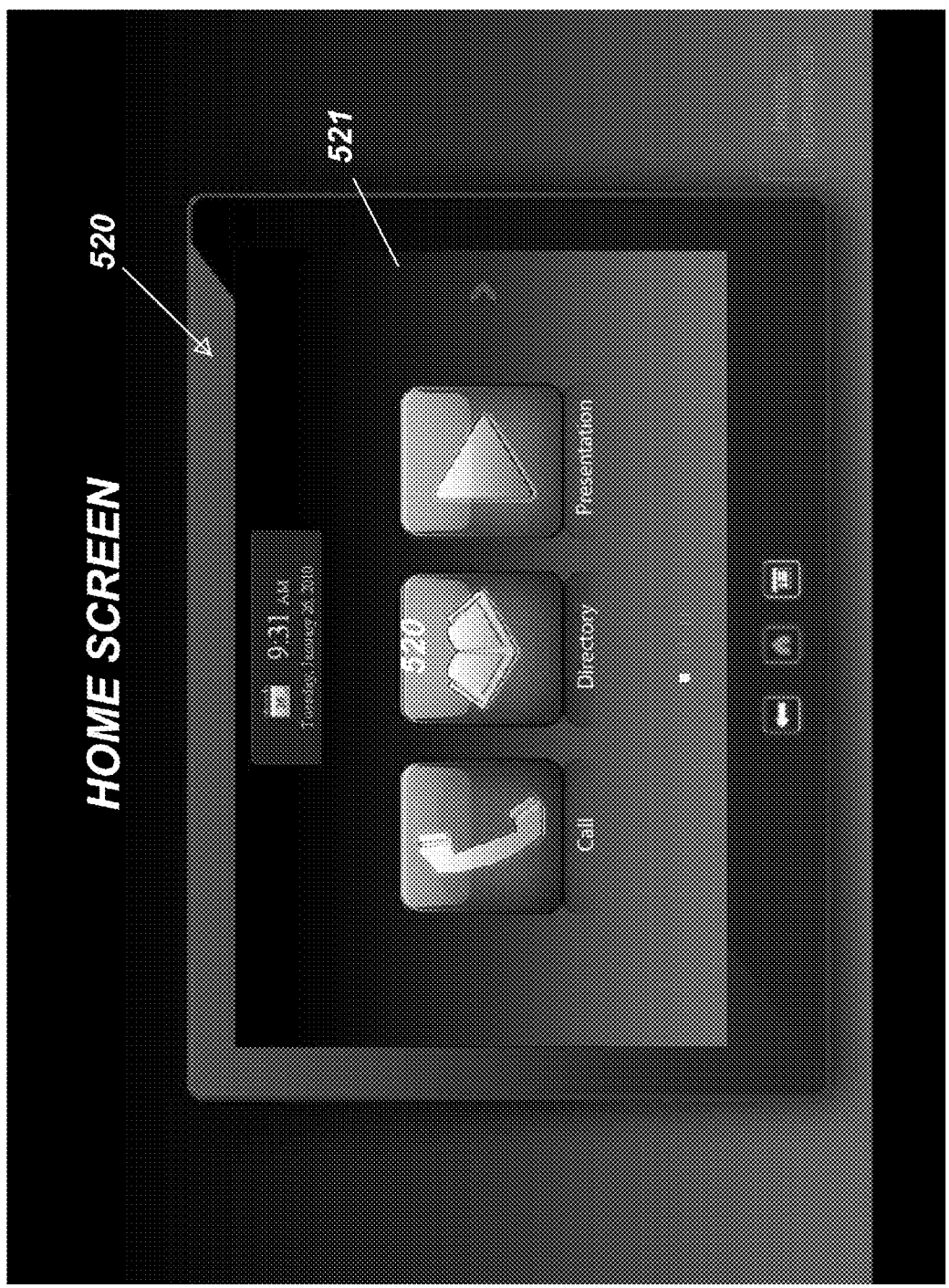
FIGS. 11A-11C illustrate a top-level menu structure of the touch panel device.

Turning now to FIG. 11A, touching or pressing the home button 512 at the lower center can present a home menu 520. This home menu 520 can provide a variety of user interface items relating to the management of a video conferencing system, as well as generic user interface items. For example, at the top of the menu 520, the date and time can be displayed, which can be used to determine an appropriate time to join a scheduled conference. Also provided on this menu 520 are icons relating to call control, directory functions, and presentation controls. A user may touch one or these icons to activate a menu for controlling such items, each of which are discussed in more detail below.

Additional user interface features can include a dual purpose icon, such as the arrow located at the right hand side of the menu 520, for indicating that at least one additional page of items is available in the menu and for accessing this additional page of items, e.g., by touching the icon. Other user interface items include the page indicators at the bottom of the menu 520, which can take the form of three squares, each corresponding to a page of the menu, with a filled in or highlighted square indicating the current page. In alternative embodiments, rather than touch-sensitive regions on the screen, these functions could be accessed by soft keys located at an appropriate location on the periphery of the menu 520 with corresponding indicating icons displayed on the menu 520. Additionally, navigation may be accomplished with touch gestures, such as a swipe, flick, drag, or slide gestures using a pre-determined number of fingers.

In either case, the indication in FIG. 11A illustrates the user is currently viewing a first page or screen 521 of three pages of the current menu 520. The page-indicating icons can also be used to directly access a desired page of the menu. For example, touching the rightmost square can directly access the third page of items at this menu level without going through the second page. Touching the center square can directly access the second page of menu items, which could also be accessed by touching the arrow at the right hand side.

Figure 11B:

With reference to FIG. 11B, a second page 522 of the home menu 520 for controlling the videoconferencing system (10) is illustrated. As in the prior page 521, three primary icons are displayed, which can be used for accessing control functions relating to camera control, audio control, and calendar functionality. Each of these is described in greater detail below. As in the prior page 521, additional user interface items are provided including a date and time indication, arrows for indicating the presence of additional menu pages in either direction from the current page, and page indicators indicating that the second page 521 of three pages is currently displayed and directly accessing either of these two pages.

Figure 11C:

FIG. 11C illustrates a third page 523 of the home menu 520 for controlling the videoconferencing system (10). As in the prior pages 521-523, three primary icons are displayed, which can be used for accessing control functions relating to system information, user settings, and administrator settings. Each of these is described in greater detail below. Additionally, as in the previously described pages 521-522, icons for indicating the presence of additional pages of menu items, indicating which page is currently displayed, paging through the various pages, and directly accessing the various pages are provided.

As can be seen from the three pages 521-523 of home menu items illustrated in FIGS. 11A-11C, the primary icons can be arranged so that more frequently used items are presented in the earlier pages. Thus, for example, when the home menu button 512 is pressed and the first page 521 (FIG. 11A) of menu items is displayed, it includes the call, directory, and presentation icons, which would typically be the most frequently used items as they are necessary to establish a call, as described in greater detail below. Similarly, the second page 522 (FIG. 11B) of menu items displays controls relating to camera and audio control and calendaring, which may be used less frequently than the primary controls for starting a conference, but will still likely be used more frequently than the configuration controls in the third menu page.

Additionally, while any number of icons per page may be displayed, the grouping illustrated in FIGS. 11A-11C with three icons per page 521-523 is further advantageous in that it provides reduced screen clutter, groups items together according to their approximate level and priority of use. For example, a relatively inexperienced user who merely wants to initiate a call need look no further than the first page 521 of menu items. Conversely, a more advanced user who desires to adjust video or audio properties can access the second page 522, which the relatively inexperienced user need never access. Finally, an administrator who needs to configure the system to interact properly with other systems or an enterprise network can directly access the more advanced user and administrator settings on the third page 523, which need never be accessed by the less sophisticated users.

Figure 12A:
FIGS. 12A-12K illustrate a call menu structure of the touch panel device.

Returning briefly to FIG. 11A, touching the "call" icon can access a call control menu (530), comprising multiple screens illustrated in FIGS. 12A-18. With reference to FIG. 12A, a first dial screen 531 is indicated. In some embodiments, it is this screen 531 that may be directly accessed by activating the call icon on the first page (521; FIG. 11A) in the home menu (520). The first dial screen 531 includes a number of user interface elements, most notably the centrally located dial pad, which can be a numeric keypad substantially similar to that used on conventional audio telephones, but which may include additional elements, such as a "dot" or period on the star key for delineating IP addresses or a plus-sign on the zero key for delineating extensions or other enhanced dialing features. The "buttons" of this dial pad are preferably touch-sensitive regions of the screen.

Figure 12B:
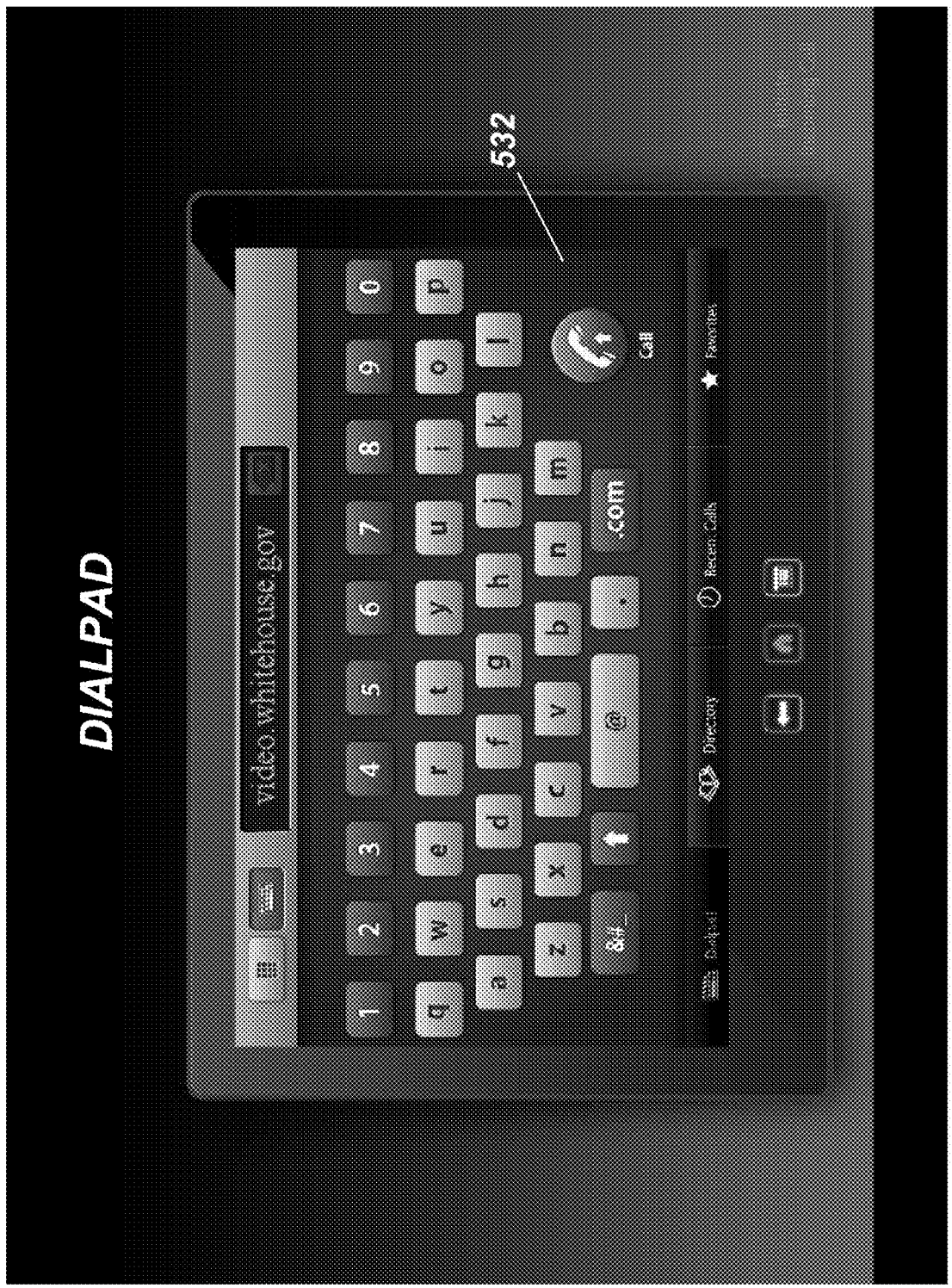

At the upper right corner of the screen 531 are two "buttons," in the form of touch-sensitive icons, that can be used to switch the dial pad between the numeric keypad illustrated in screen 531 of FIG. 12A and the alphanumeric keypad illustrated in the screen 532 of FIG. 12B. Depending on the particular dialing scheme to be used, the alphanumeric keypad may provide for easier dialing. Additionally, shortcut keys may be provided, such as the ".com" key, which can be particularly advantageous when dialing standard internet addresses. In a preferred embodiment, the mode currently selected (e.g., numeric or alphanumeric) can be indicated by a graphic corresponding to a depressed toggle switch or other indication.

At the top of the screens 531-532, a window is provided for indicating the dial string entered by the user. A backspace icon can also be provided for correcting inadvertent errors in entering the dial string. Additionally, once a dial string has been entered, a "call" icon for placing the call becomes active and can be touched to dial the entered string to begin the conference. Further aspects of call initiation will be further described below.

Finally, turning back to FIG. 12A or FIG. 12B, additional dialing modes may be accessed by activating one of the touch sensitive icons located at the bottom of the screen 531 or 532, which can include the dial pad, a directory, a listing of recent calls, and a listing of favorites. Each of these dialing modes will be described in greater detail below. Alternatively, the touch-sensitive icons may be replaced with buttons or touch-sensitive regions of the bezel 504 corresponding to icons or other indications on the touch screen 502 adjacent that region of the bezel 504. In a preferred embodiment, the icons provide some indication of the presently selected mode, such as shadowing to simulate a depressed toggle switch, as illustrated in FIGS. 3A and 3B.

As noted above, and with reference to screen 533 of FIG. 12C, a conference may be initiated by selecting an entry from a directory as an alternative to direct entry of the dial string. The directory may be stored in the videoconferencing system (10; FIG. 1) itself or provided via a network server. The directory may be accessed by touching the touch sensitive icon at the bottom of the screen (531-532) illustrated in FIGS. 3A and 3B. The directory screen 533 of FIG. 12C can provide a variety of UI features for selecting a call destination, including a listing of directory entries. Entries in the list may be accessed by scrolling through the list, which can be activated as a single finger or multiple finger gesture, such as the sliding of a pre-determined number of fingers in the direction desired. Alternatively, an alphabetic listing may be provided adjacent the listing, whereby a user may select names beginning with a particular letter by touching (or scrolling through the alphabetic listing).

As yet another alternative, a user may search for a particular entry by entering all or part of a name. Searching may be activating by touching a data entry region located at the top of the screen 533, which can activate an on-screen virtual keyboard 534 as illustrated in FIG. 12D. Entering letters of a desired entry can cause the directory listing to scroll to the first entry corresponding to the entered letters, as illustrated in FIG. 12E. Additionally, only entries that match the entered string are displayed. Once a sufficient number of characters has been entered to uniquely specify one directory entry, only that entry may be displayed, as illustrated in FIG. 12F. In addition, at any point in the search, a search for corresponding entries may be made by pressing the search icon/virtual key.

Returning to FIG. 12C, additional features of the directory user screen 533 are shown. Each directory entry can include an identification of the person or place, such as a textual name, as well as an indication of the type of videoconferencing equipment available. Additionally, status or "presence" information like that can be displayed, such as whether a person is available, offline, or not to be disturbed. Additionally, an information icon can be provided for each directory entry, which can provide a link to display still further information about a directory entry.

Figure 12C:
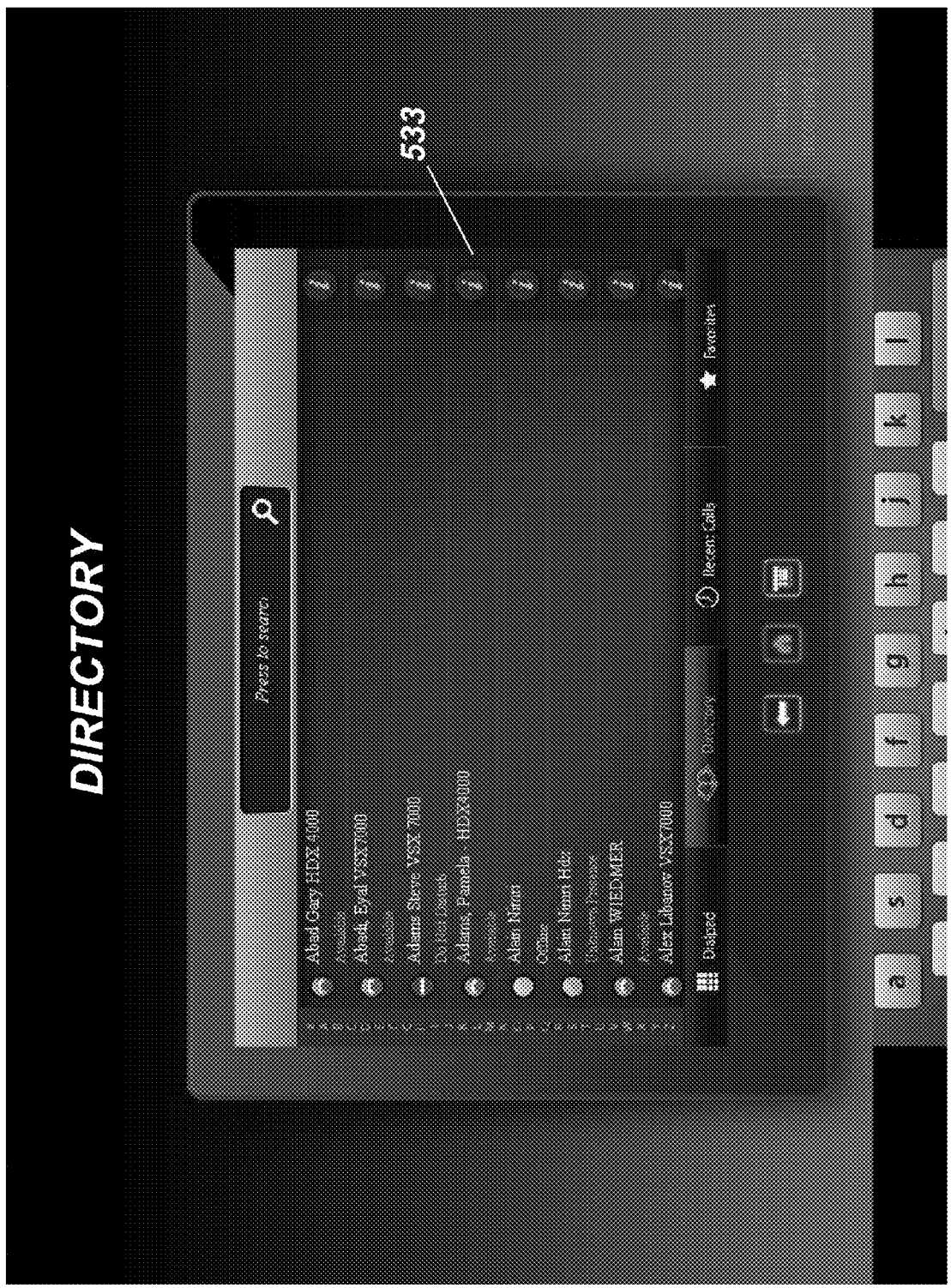
Figure 12D:
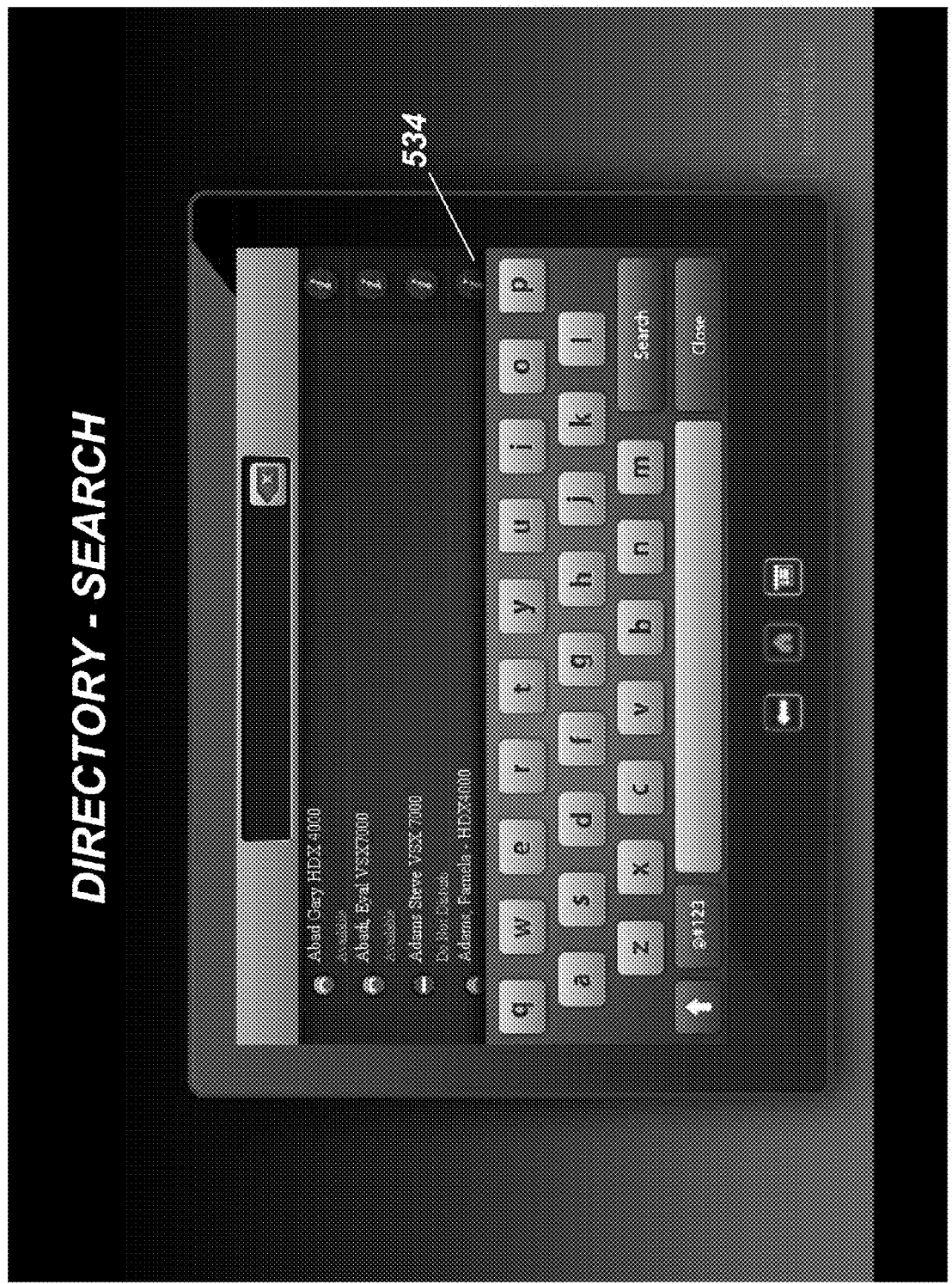
Figure 12E:
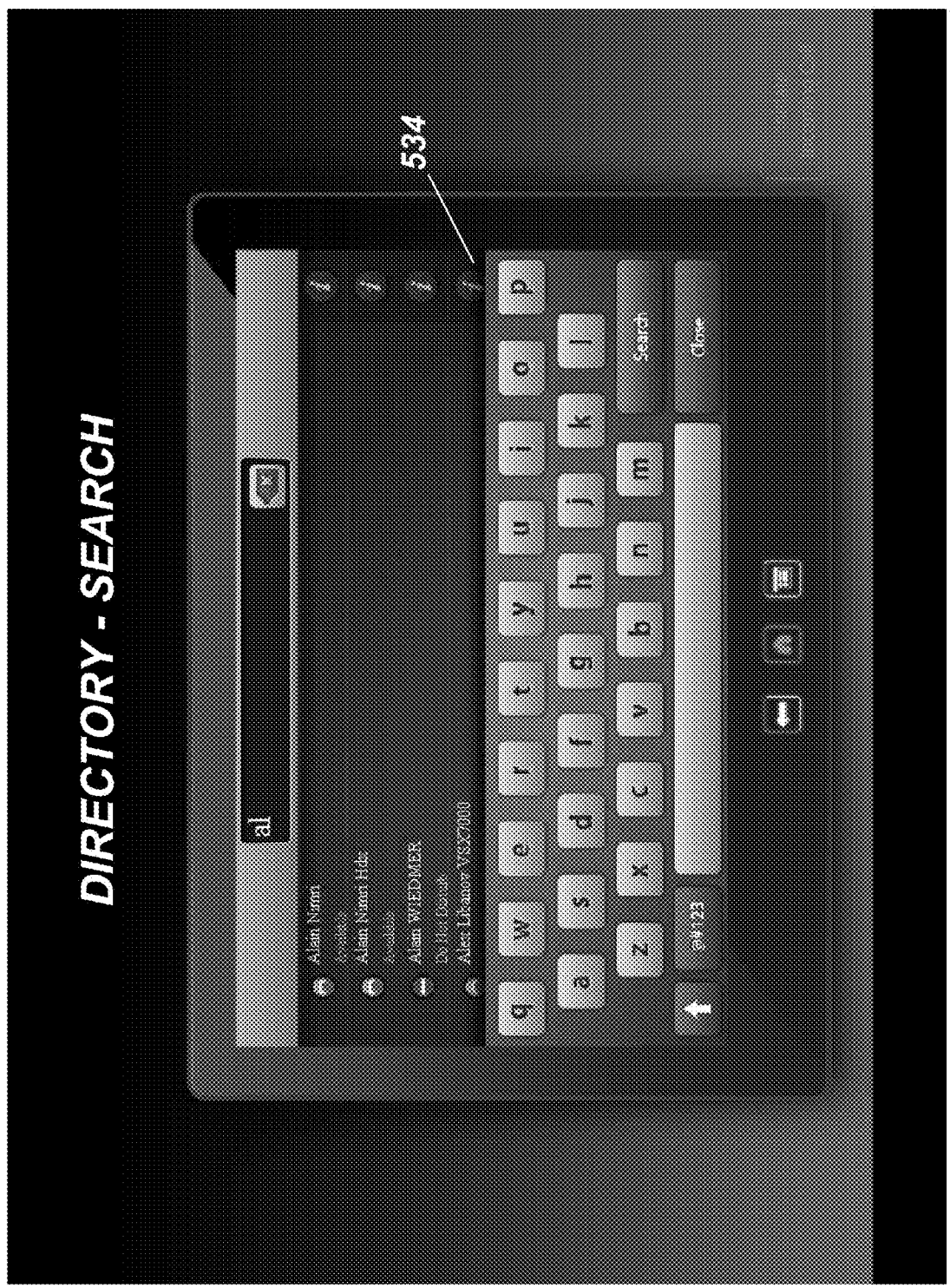
Figure 12F:
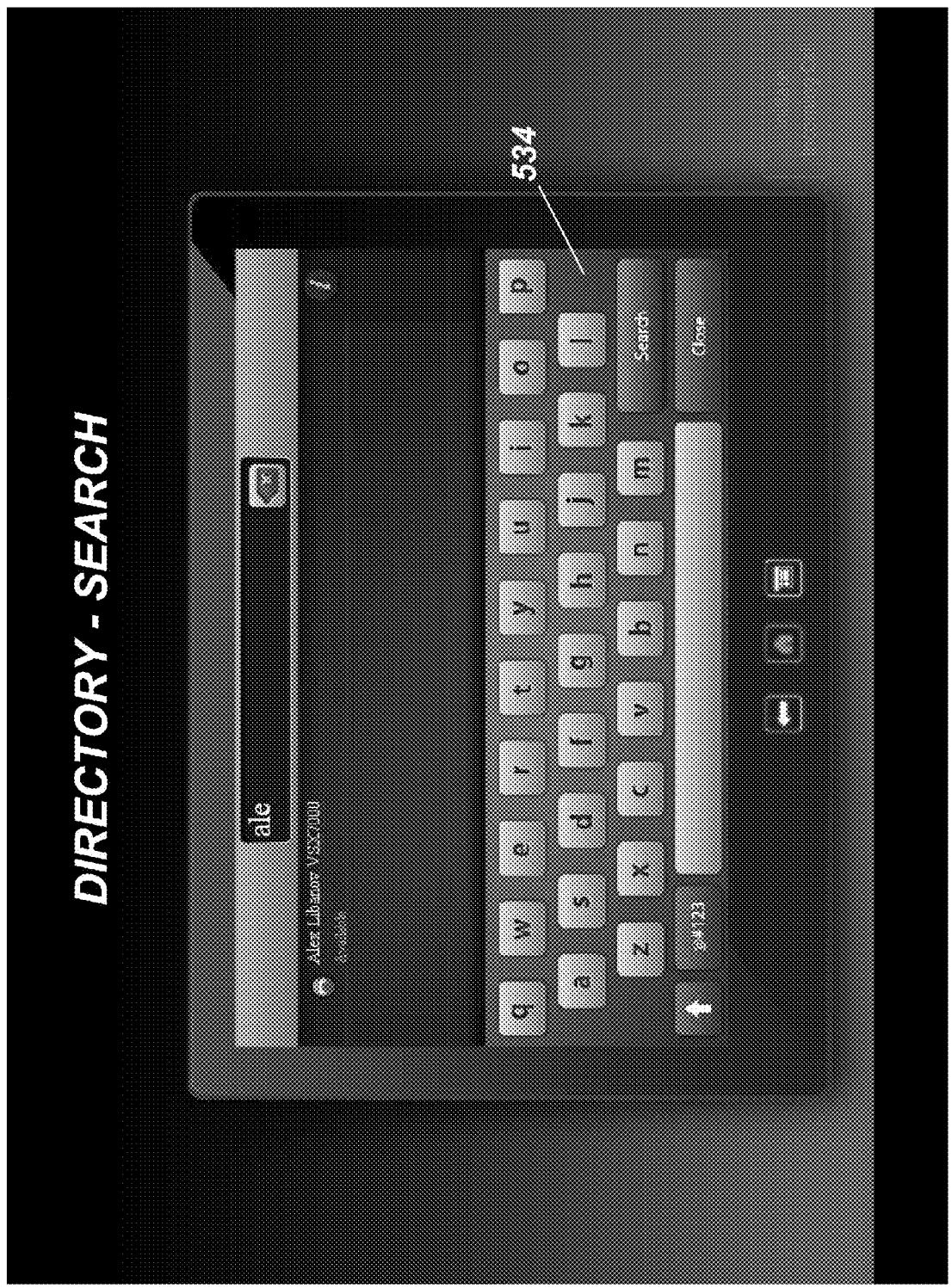
Figure 12G:
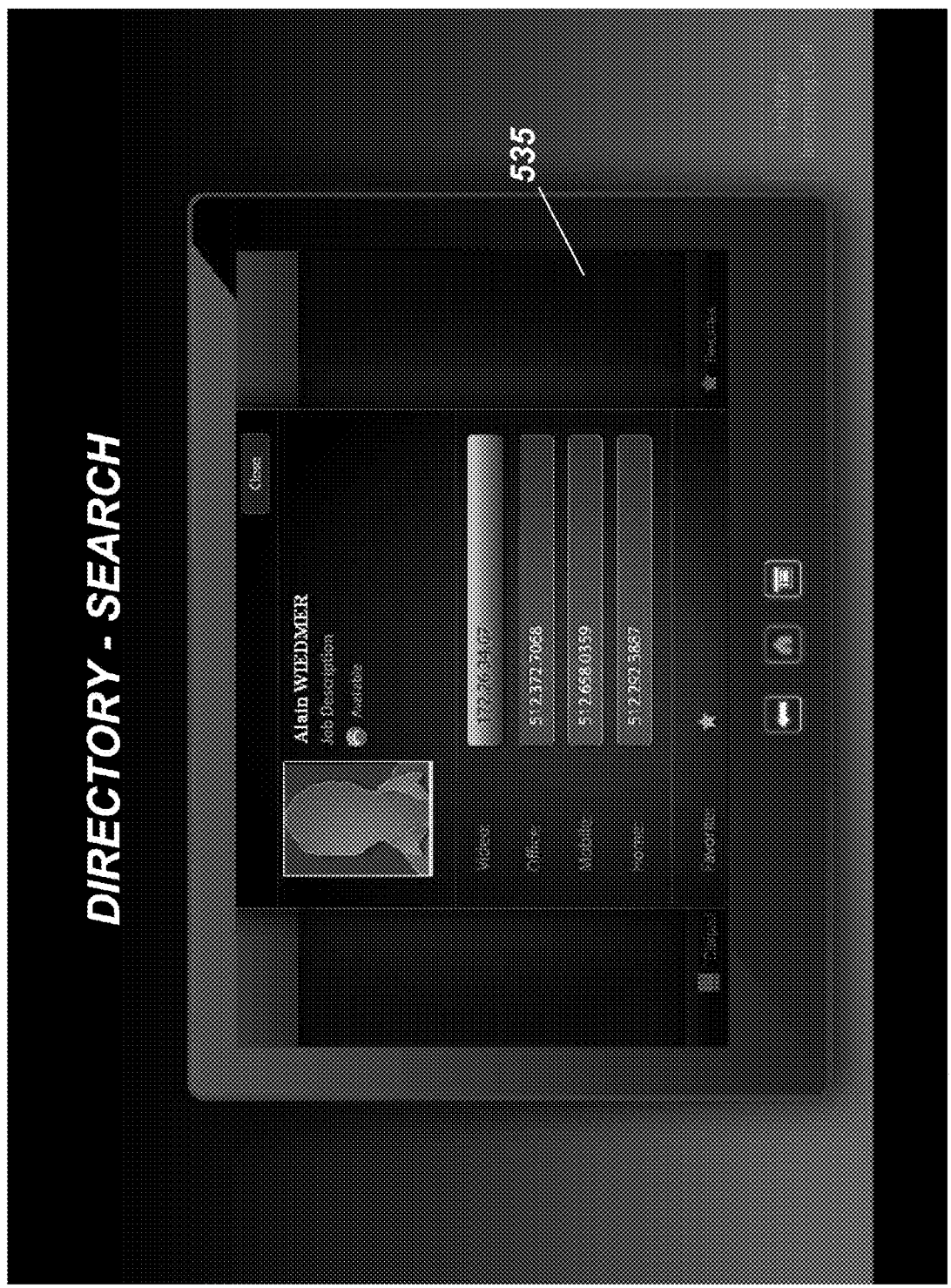

An exemplary additional information screen 535 for a directory entry is illustrated in FIG. 12G, in which the additional information includes full name, title or job description information, contact numbers for video and audio, including office, mobile, and home numbers, a photograph, presence information, and a dialog box for adding a person to a list of favorites (which will be discussed in greater detail below).

At any point in any of the directory-based dialing modes, a call may be initiated to a particular directory by touching the desired directory entry or a particular number within the desired directory entry, as will be described in more detail below.

Figure 12H:
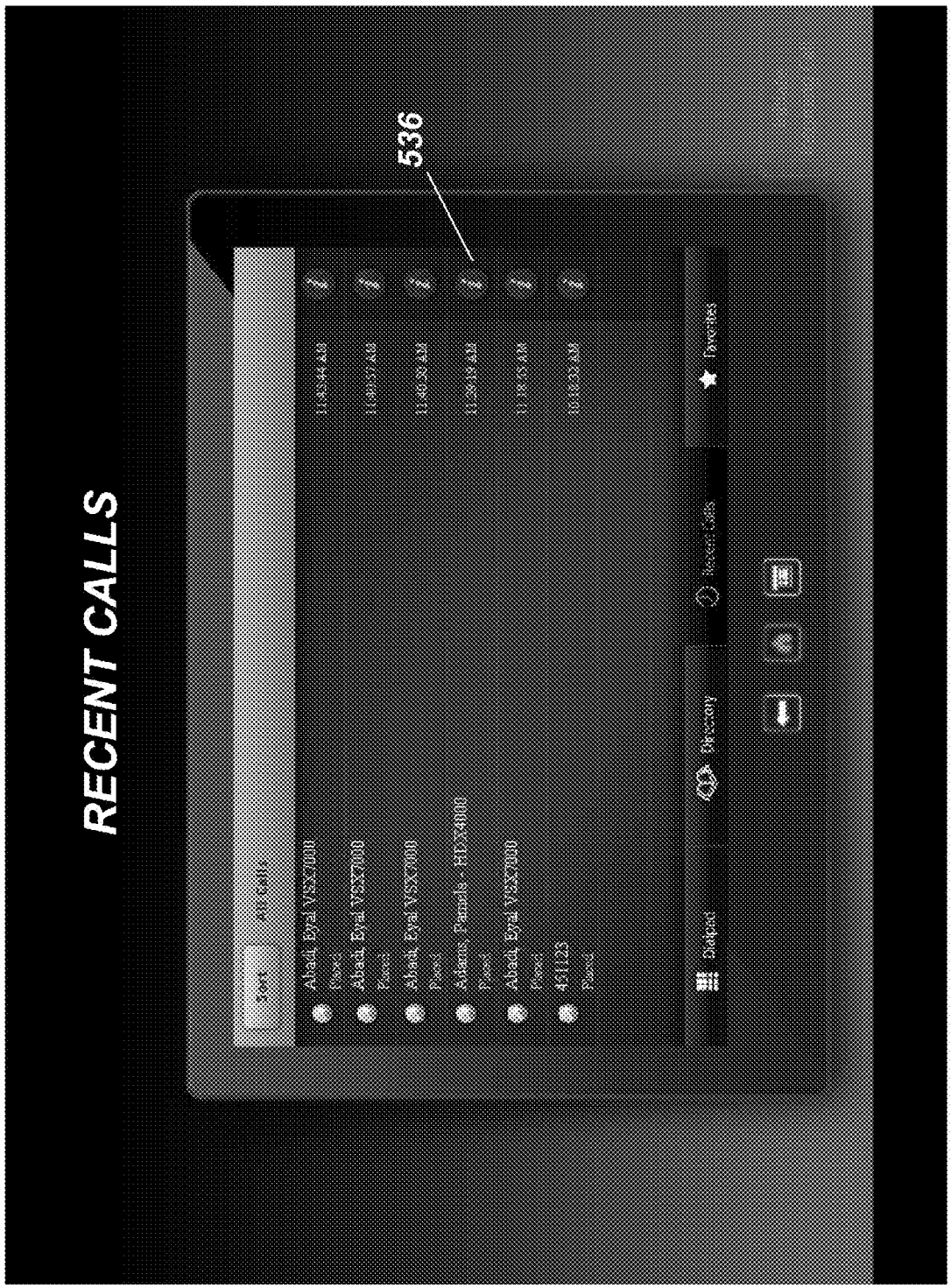

With reference to any of the screens 531-533 of FIGS. 12A-12C, a number to be called may be selected from a list of recent calls by touching the Recent Calls icon located at the bottom of the touch screen 502. An exemplary recent call log screen 536 is illustrated in FIG. 12H. The call log can include identifiers similar to those in the directory, which can include a name and type of equipment of a call destination and an icon and/or text to indicate whether the call was an outgoing (i.e., placed) or incoming (i.e., received) or uncompleted (i.e., missed) call. Additionally the listing can include an indication of the date and/or time that the call was placed or received. As with the directory listing, an information icon can be provided, which can link to an additional screen showing additional information about the entry. Additionally, a feature to sort/search calls from the recent calls log can also be provided.

Figure 12I:
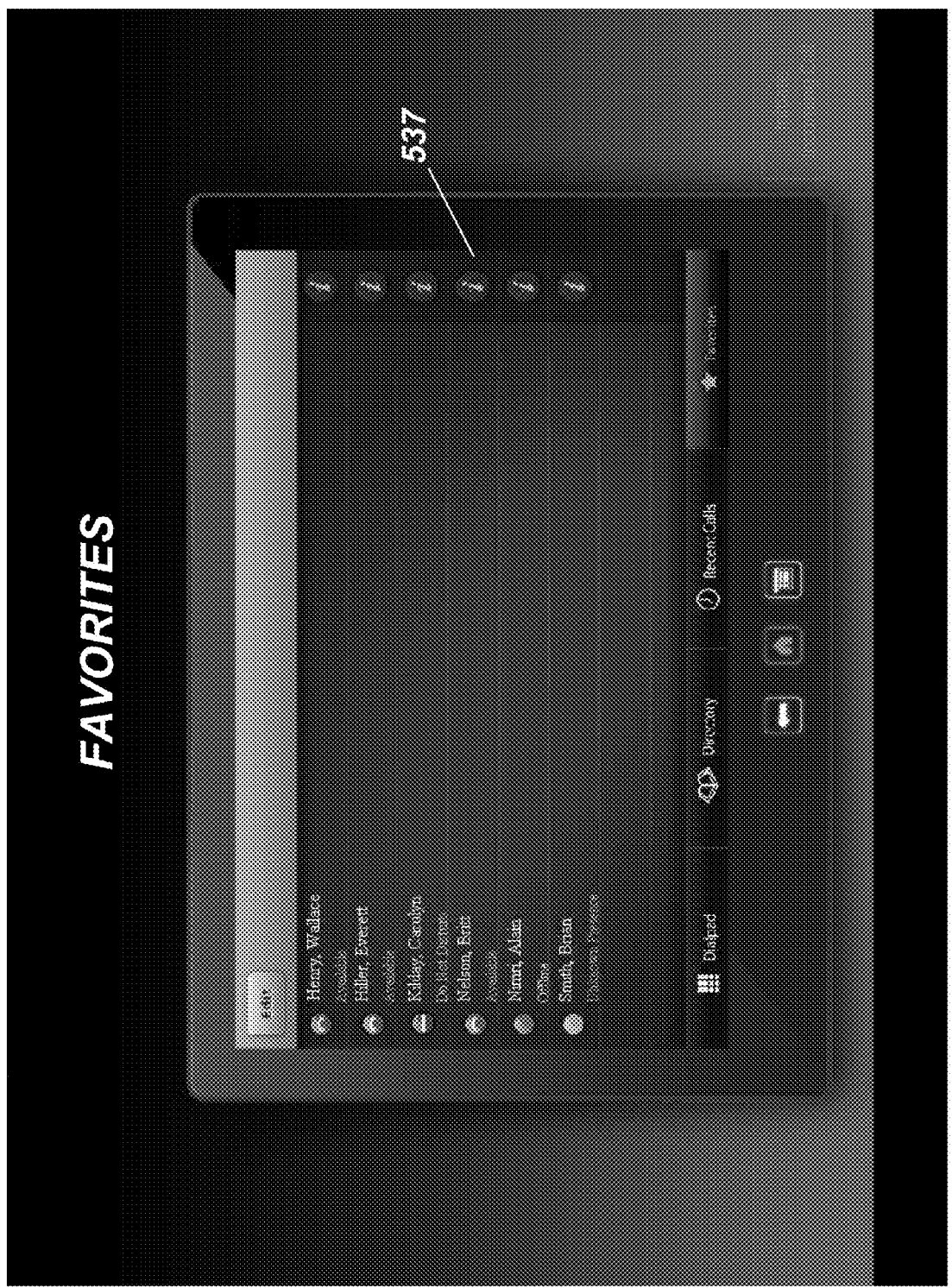

Finally, with reference to any of the screens 531, 532, 533, or 536 of FIG. 12A, 12B, 12C, or 12H, a number to be called may be selected from a list of favorites by touching the Favorites icon located at the bottom of the touch screen 502. An exemplary favorites list screen 537 is illustrated in FIG. 12I. Entries may be placed in the favorites list by selection from one of the information screens or by any of a variety of other means. As with the other dialing screens of FIGS. 12A-12H, an entry may be dialed by touching, entries may be scrolled, and names as well as presence information may be provided, along with links to more detailed information.

With continued reference to FIG. 12I, the user interface during a call can be further explained. By selecting an entry from the favorites list screen 537, for example, a call can be initiated. Once the call is established, call controls can be presented as illustrated in the call screen 538 of FIG. 12J. In one embodiment, six icons can be presented for features commonly used during a call, including: a hang up icon for terminating the call; an add call icon for adding another party to a multipoint call; a camera button, which can link to the camera control features described below; a dial pad icon, which can link to a dial pad for adding additional participants to a multipoint call or for entering security or access codes to access a call; and a layout icon, for controlling the layout of various participants including the near end participant and one or more far end participants. Alternatively, these icons can be substituted with soft keys located adjacent the display, in the form of either actual buttons or touch sensitive regions on the bezel 504. Additionally, the call controls screen 538 of FIG. 12J can also include a mute icon, an indication of the time spent on the call, and an adjustment for speaker volume.

Operation of the various controls illustrated in FIG. 12J will now be described. Touching the hang up icon will terminate the call and can return the user to the home screen (520;

FIG. 11A) or the screen displayed prior to the call. Touching the add call icon will display a dialing screen 539 as illustrated in FIG. 12K. The dialing screen 539 in FIG. 12K is substantially similar to those discussed above in that it provides the opportunity to select an additional participant by dial pad (either numeric or alpha numeric), directory listing, from a listing of recent calls, or from a listing of favorites. All of the various features discussed above, such as searching, scrolling, information and presence displays, etc. are also available in this mode. Additionally, because a call is ongoing, additional interface devices, including mute toggle, volume control, and return to call icons are also provided.

Figure 12J:
Figure 12K:
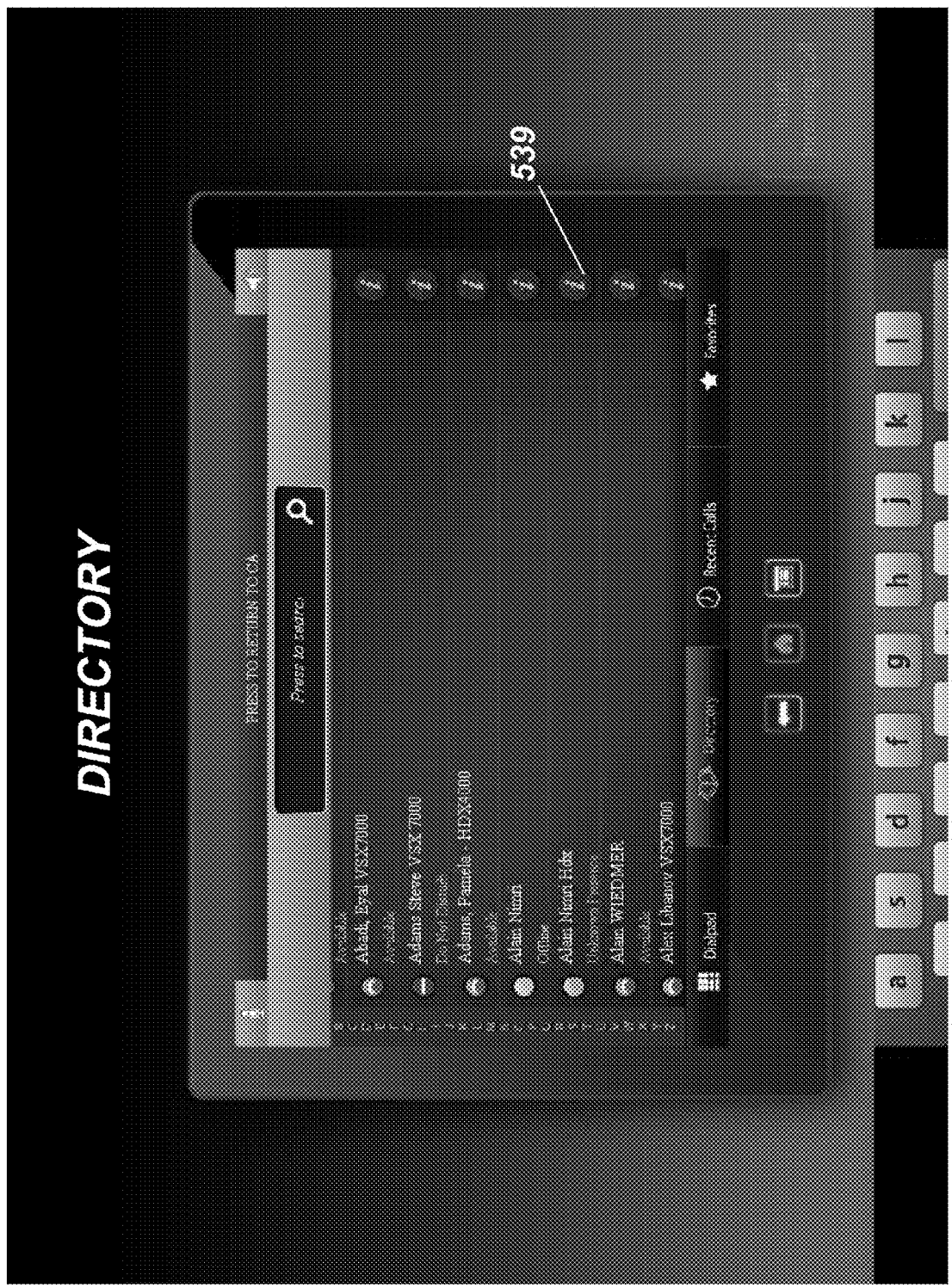
Figure 13A:
FIGS. 13A-13B illustrate a camera control menu of the touch panel device.
Figure 13B:

The camera control icon, illustrated in the call screen 538 FIG. 12J, can activate a camera control screen 540 illustrated in FIG. 13A. As with other control screens activated while on a call, mute toggle, return to call, and volume control icons can be provided on this screen 540. Additionally, the view of the currently selected camera can be displayed, along with camera control icons including, for example, pan and tilt controls (the displayed arrows) and zoom controls (the displayed + and − signs). Additionally, a toggle can be provided to allow the user to select between control of a near end camera (as in screen 540 of FIG. 13A) and a far end camera (as in screen 541 of FIG. 13B). Additionally, a Show/Hide Presets toggle may be provided to allow a user select from one or more predetermined pan, tilt, and zoom coordinates.

Figure 14:
FIG. 14 illustrates a camera/source selection menu of the touch panel device.
Figure 15:
FIG. 15 illustrates a presentation control menu of the touch panel device.

Finally, a switch camera icon can be provided, which can call up a camera/source selection menu 550 illustrated in FIG. 14. The switch camera/source menu 550 can allow, selection among various video sources, including, for example, a main camera showing conference participants, a document camera, a DVD and/or VCR, and a computer showing presentation information. The switch camera menu 550 can be provided for both near end and far end cameras, and the preset selection menus may be available for each near and far source, as appropriate. In other words, the menu 550 of FIG. 14 can be accessible for the near and far ends from the separate screens 540-541 of FIGS. 13A-13B) to control near and far end cameras and sources.

Returning now to the call screen 538 of 3J, as was noted above, a dial pad icon can provide an interface for adding additional participants to the conference and/or for entering numeric or alphanumeric data such as passwords or access codes. The show presentation icon may be activated to launch a presentation control screen 560 illustrated in FIG. 15, which can be used to select a presentation image source, such as a computer running a presentation display program, a DVD player or VCR, a storage device, such as a USB flash memory device or external hard drive, or a document camera. As with the camera control menus 540-541 of FIGS. 13A-13B described above, these devices can be ones directly attached to the user interface device 500, directly attached to the videoconferencing unit (100), or virtually connected to either by virtue of network connections between the user interface device and/or videoconferencing unit and the presentation source(s).

Figure 16A:
FIGS. 16A-16C illustrate a storage access menu of the touch panel device.
Figure 16B:
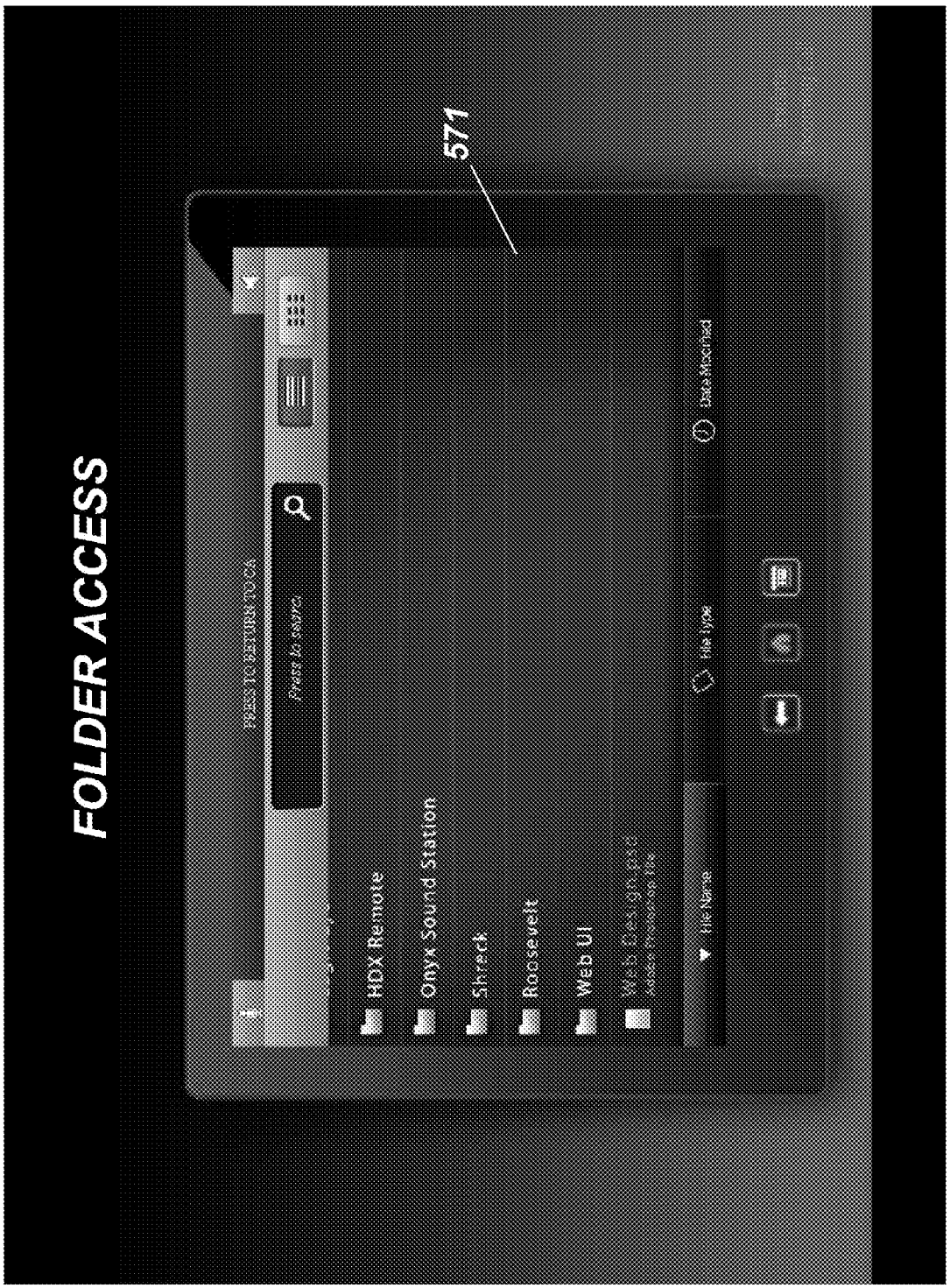
Figure 16C:

If the storage device icon is selected of the presentation control screen 560, a storage access screen 570 such as that illustrated in FIG. 16A may be presented, which allows a user to select presentation content from among folders (see folder access screen 571 of FIG. 16B) or among a gallery of various content types (see gallery access screen 572 of FIG. 16C).

With reference to the folder access screen 571 of FIG. 16B, interface icons may be selected to allow searching of the content (which will display a virtual keypad as described above), as well as a list of folders, which can be sorted by icons corresponding to file name, file type, or date modified.

Additionally, like the directory and other list entries described above, scrolling through the list using one or multi-finger gestures may also be facilitated. Additionally, the listing can include icons corresponding to the type of entry, such as a folder or file type. A toggle button may also be provided to switch between the file listing and a categorical reference as illustrated in FIG. 16C. As shown in the gallery access screen 572 of FIG. 16C, the content types may includes presentation slides, such as those used with typical presentation software, documents, such as word processing documents, spreadsheets, images, movie, music and sound, as well as various other media file types.

Figure 17:
FIG. 17 illustrate a call control screen with modifications.

In any case, once a content source is selected, call control returns to the primary call screen 538 illustrated in FIG. 17, which corresponds to that discussed above except for the addition of visual indication to the user that content is being displayed, which can take the form of shading of the screen area with a particular color and/or brightness. Additionally, the Show Presentation icon discussed above is replaced with a stop presentation icon.

Figure 18:
FIG. 18 illustrates a layout menu of the touch panel device.

Finally, the layout icon on the call control screen 538 can access a layout control screen 580 illustrated in FIG. 18. The layout control screen 580 can include various icons to allow adjustment of video size, picture-in-picture properties, including presence and removal, and can include a dual monitor emulation mode, which allows for two image streams to be displayed side-by-side on a single monitor. The layout controls can allow the user to control what is seen on the various monitors and where and how various video information is displayed on each monitor. The video information controllable here can be from devices connected (either directly or virtually via network connections) to the user interface device, videoconferencing system, or to other videoconferencing systems connected in a call or conference. In addition, sources can include video information coming from a Multipoint Conferencing Unit (MCU) connected to the call or conference.

Returning now to the main menu 520 illustrated in FIG. 11A, the directory icon can be used, whether on a call or off, to access the directory functionality described above. Similarly, the presentation icon can be used to access the presentation control screens described above. Turning to FIG. 11B, the camera icon can be used to access the camera control screens described above. Note that if the camera control screen is selected while not on a call, then only near-end control features will be available. Similarly, the audio icon illustrated in FIG. 11B will select an audio control screen similar to that in the in-call screen described above, which provides muting and volume control functionality.

Figure 19A:
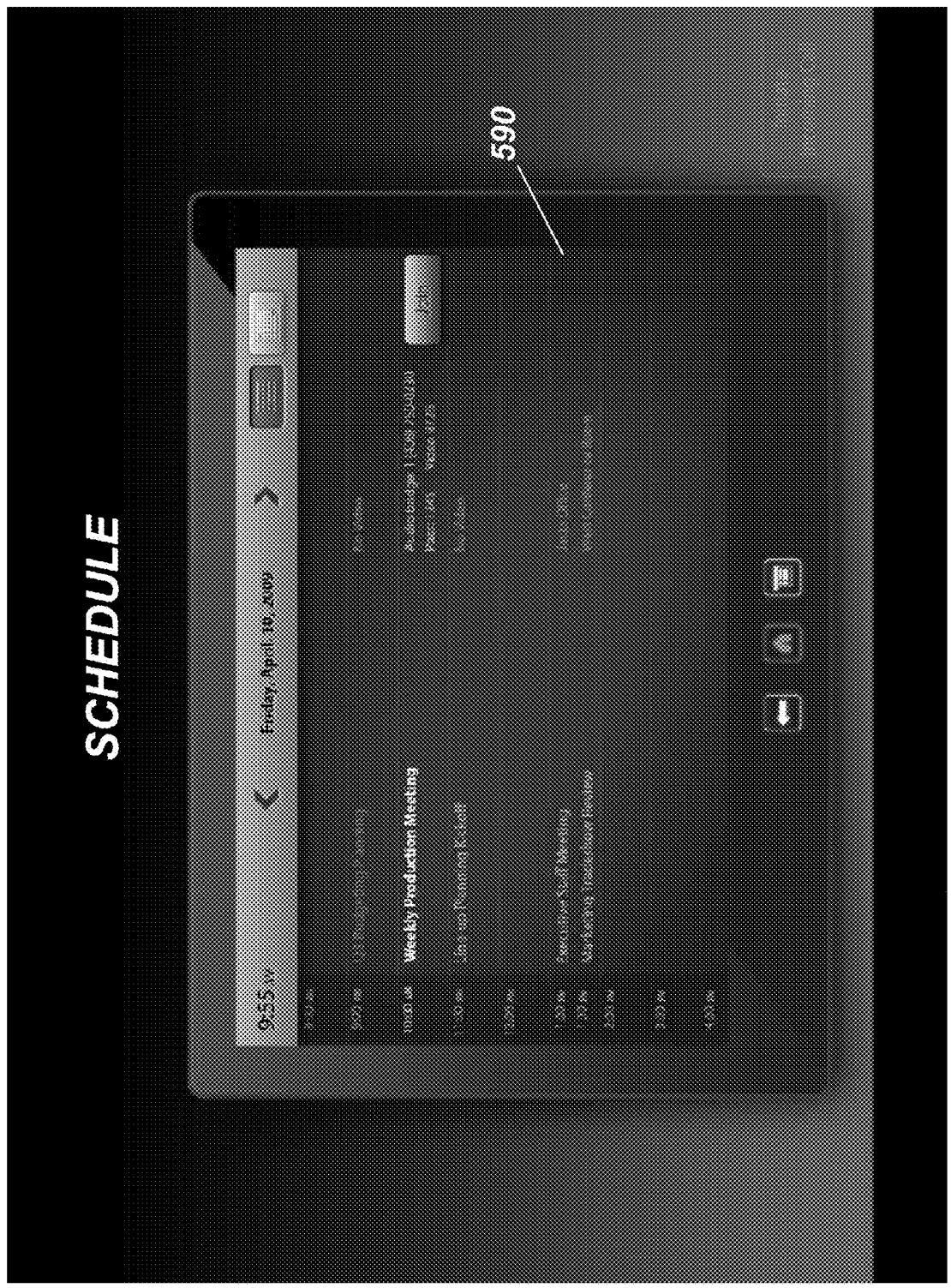
Figure 19B:
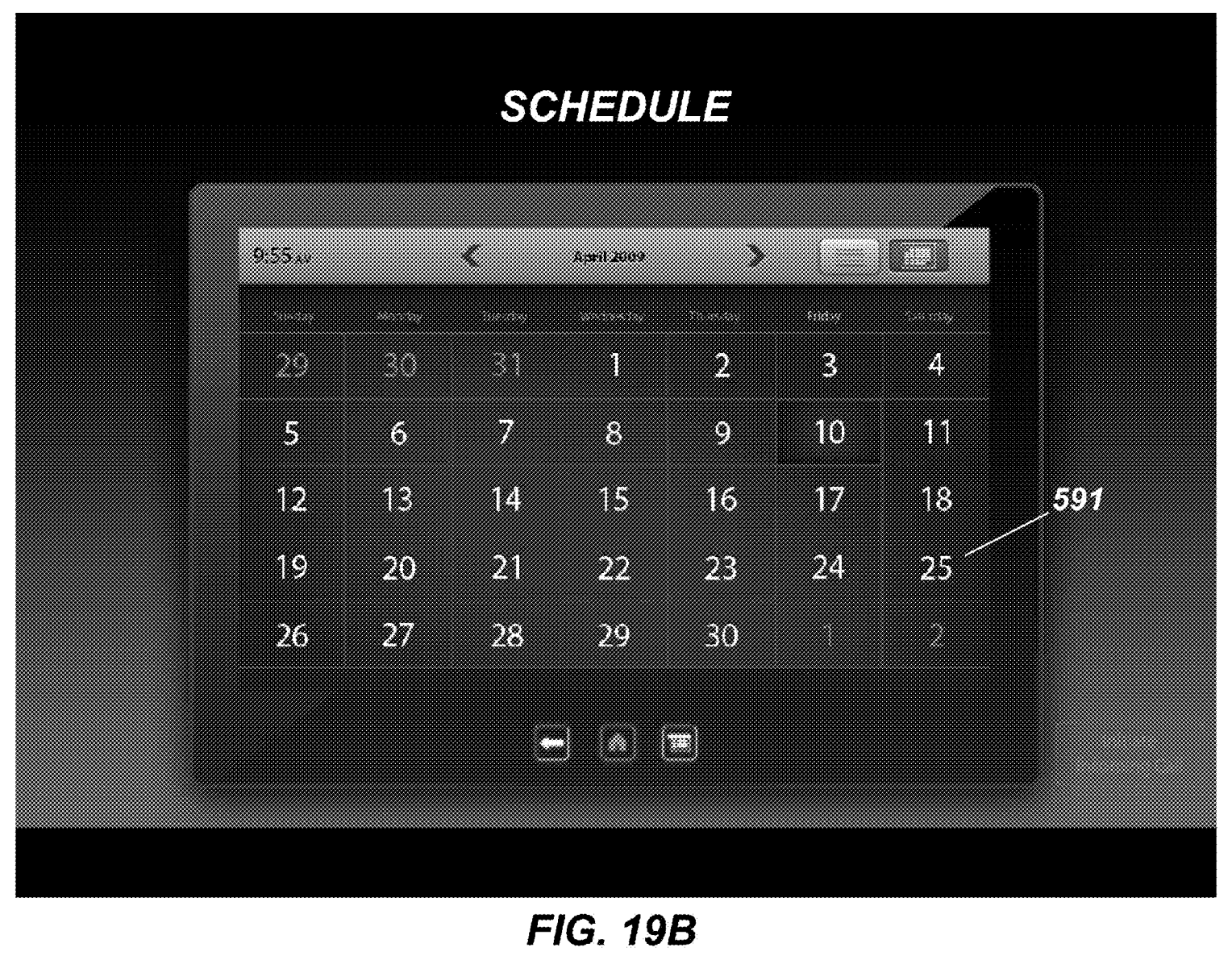

Continuing with reference to FIG. 11B, the calendar icon will select a calendar screen 590 illustrated in FIG. 19A. The calendar screen 590 in FIG. 19A can provide an indication of all scheduled conferences for a conferencing device, a conference room, and/or a person. Calendar entries can include a description of the scheduled event, call in numbers for audio and/or video, and an approximate duration. As with other entries, scrolling may be accomplished by the use of single- or multi-finger gestures. Additionally, if the calendar is accessed at a time proximate a scheduled conference, a touch-sensitive icon can be provided to facilitate joining the conference. Additional icons can be provided for navigating dates, as well as a toggle to enter a monthly vs. daily calendar view, as illustrated in screen 591 of FIG. 19B.

Figure 20A:
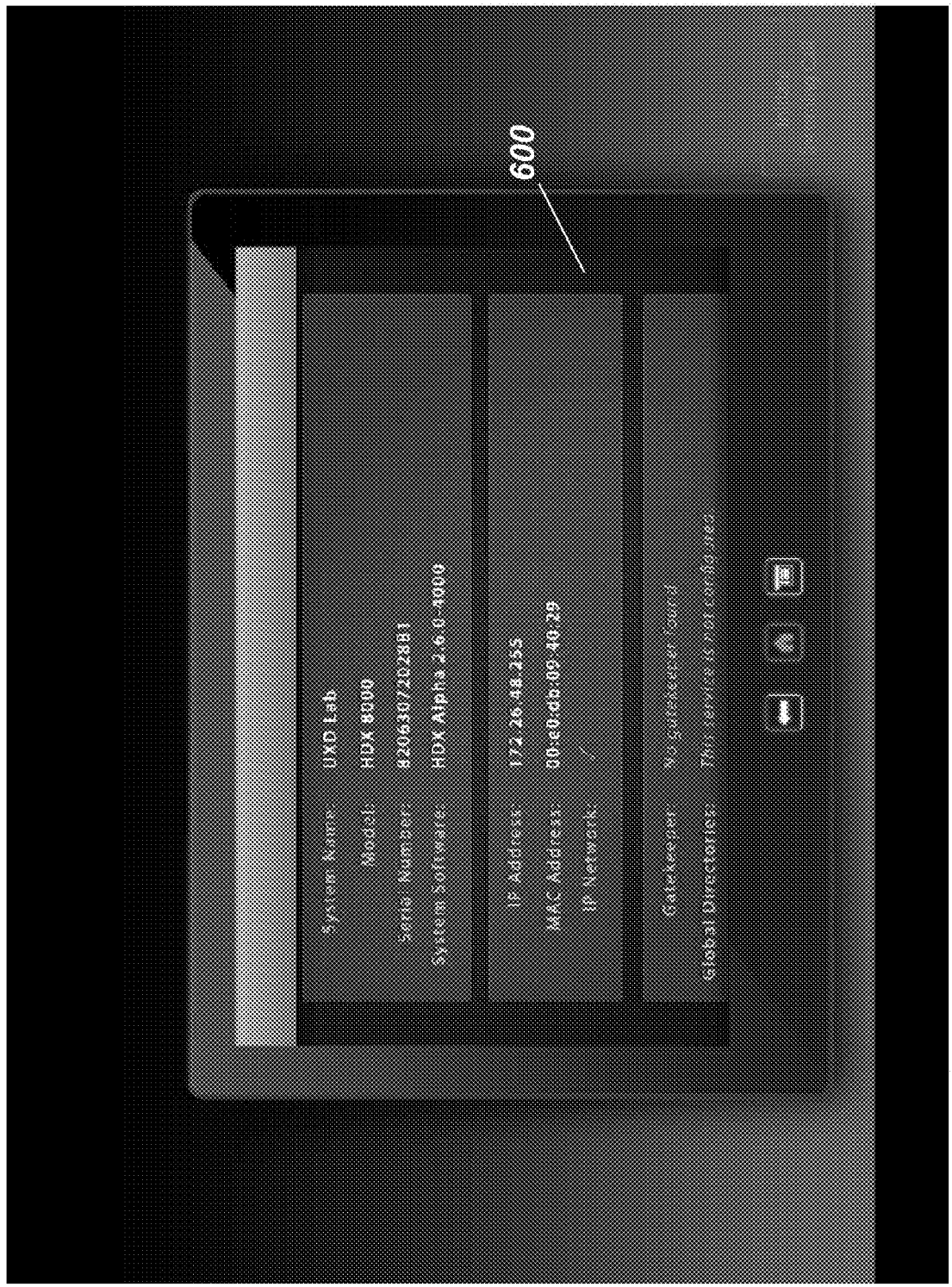
FIGS. 20A-20B illustrate preference-setting menus of the touch panel device.

Returning to page 523 of the menu 520 in FIG. 11C, touching the information icon can cause display of an information screen 600 such as that illustrated in FIG. 20A. This information screen 600 can provide a variety of information about the video system, including name, model, serial number, software revision, network address, etc. Again, scrolling and other features may also be provided.

Figure 20B:
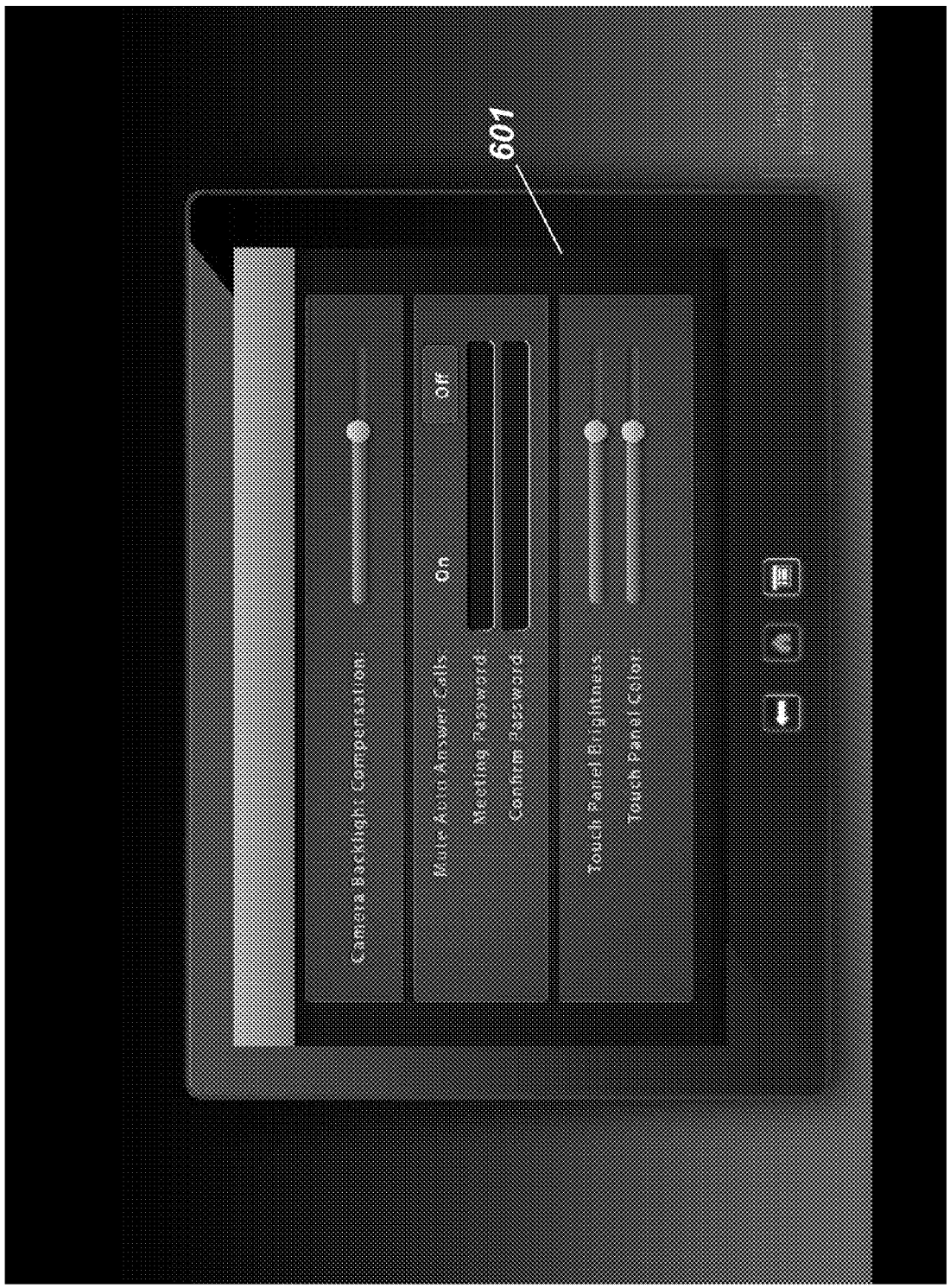

Again, with reference to FIG. 11C, activating the user settings icon can display the user settings screen 601 illustrated in FIG. 20B, which provides access to various settings such as camera backlight compensation, auto answer for calls, default passwords, as well as controls for the touch panel interface, such as brightness and color.

Activating the administrator settings icon illustrated in FIG. 11C can provide access to a logon screen that allows the entry of a username and password to restrict access to more sensitive device settings. Such settings can include maximum call durations, auto answer settings, usage reporting information, etc. The administrator settings icon may also allow access to controls for the videoconferencing system, whether via additional screens or by leveraging any web-based interface into the videoconferencing provided by said videoconferencing system through the use of a local web browser running on the user interface device.

Figure 21:
FIG. 21 illustrates an incoming call control screen of the touch panel device.

At any time, and from any screen, an incoming call may trigger display of the incoming call screen 610 illustrated in FIG. 21. The incoming call screen 610 can present the name and/or picture or other identifier of the calling party, along with icons to allow the call to be answered or ignored. If the call is answered, the system goes to the in-call screen discussed above. Alternatively, if the call is ignored, the system returns to the screen displayed prior to the incoming call.

Figure 22:
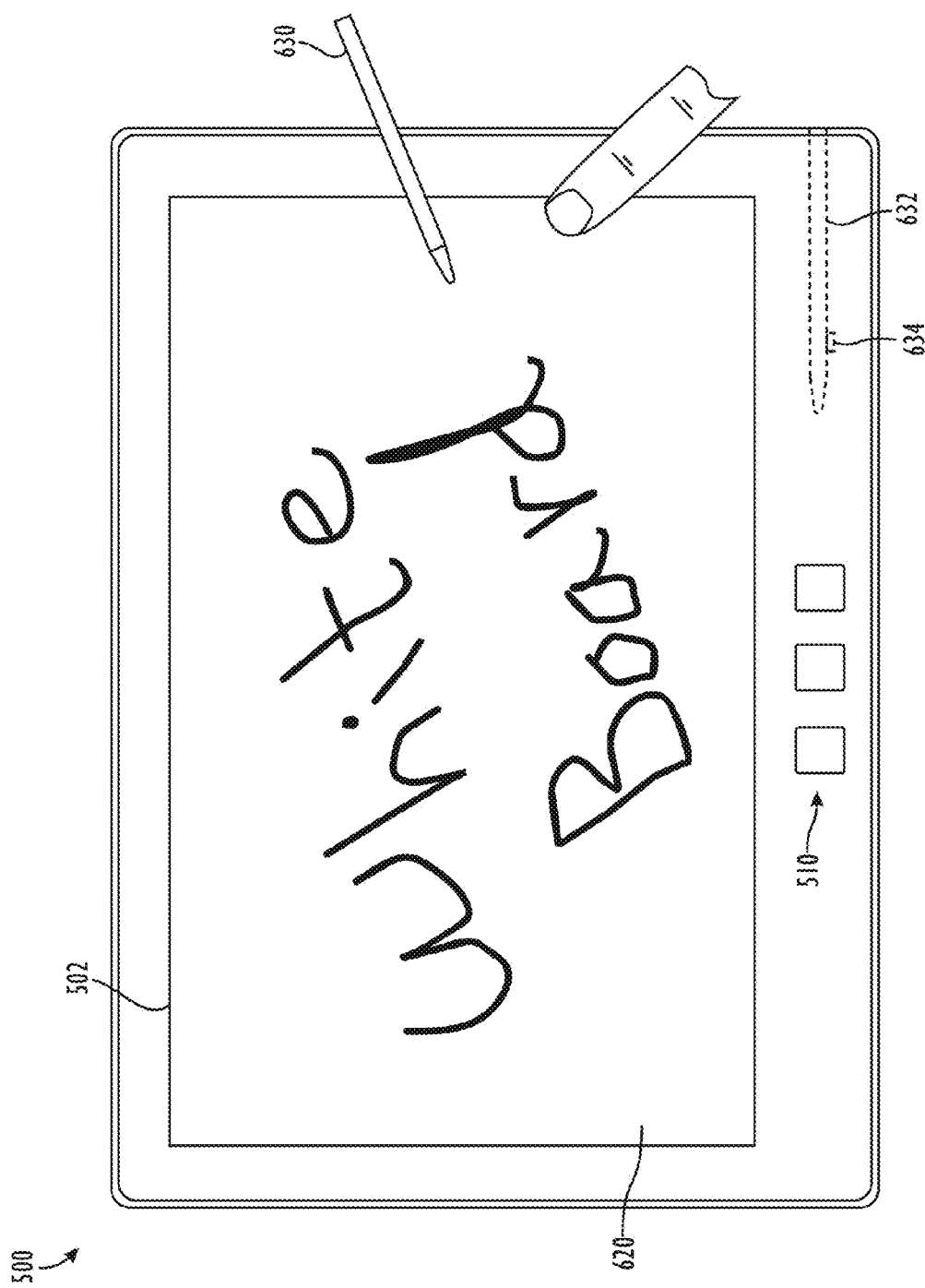
FIG. 22 illustrates the touch panel device in an annotation mode of operation.

As shown in FIG. 22, the touch screen device 500 can operate in an annotation/whiteboard mode of operation. As with previous devices embodied herein, the device 500 may or may not be configured to display content of the videoconference, such as near-end camera video, far-end camera video, computer screen content, etc. Either way, the touch screen device 500 can be configured to switch automatically into an annotation mode of operation in response to an indication from the user. In particular, the device 500 may automatically switch to an annotation mode of operation in response to a user movement/selection of a user interface item in a screen display on the touch panel 502, such as source selection screen 572 of FIG. 16C.

Alternatively, one of the buttons 510 on the device 500 may be dedicated to indicate the annotation/whiteboard mode of operation in response to user movement/selection. Finally, the device 500 may have a stylus or other user tool 630. A sensor 634 can detect movement of the user tool 630 (i.e., removal or replacement of the tool 630 in a receptacle 632 relative to the sensor 634). With the detected movement in response to the indication from the sensor 634, the device 500 can switch to the annotation/whiteboard mode (or revert to a previous mode).

In the annotation mode, for example, the touch panel device 500 can switch sources and display content 620 from any of the various sources disclosed herein. Therefore, the device 500 can display content from any of the cameras, from a remote computer, from its own internal computer circuitry, or the like. The content can also include a whiteboard generated by the device 500 itself, a remote computer, or other part of the videoconferencing system (10). Regardless of whether the content is a whiteboard or not and regardless of its source, the device 500 in the annotation mode of operation combines touch data from the touch screen panel 502 as annotation to the content 620, and the annotated content is then subsequently sent to the far-end endpoints in the videoconference. Likewise, annotations made by the user are also shown on the touch screen panel 502 for the user to view while annotating. Sending the annotated content to the far-end endpoints can be done by communicating it to the videoconferencing unit (10) if separate. Alternatively, if the touch panel device 500 has components of the videoconferencing unit integrated therein, then the device 500 can send the annotated content to the far-end endpoints.

Aspects of the invention are described as a method of control or manipulation of data, and may be implemented in one or a combination of hardware, firmware, and software. Embodiments of the invention may also be implemented as instructions stored on a machine-readable medium, which may be read and executed by at least one processor to perform the operations described herein. A machine-readable medium may include any mechanism for tangibly embodying information in a form readable by a machine (e.g., a computer). For example, a machine-readable medium (sometimes referred to as a program storage device or a computer readable medium) may include read-only memory (ROM), random-access memory (RAM), magnetic disc storage media, optical storage media, flash-memory devices, electrical, optical, and others.

In the above detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim.

Various changes in the details of the illustrated operational methods are possible without departing from the scope of the following claims. Alternatively, some embodiments may combine the activities described herein as being separate steps. Similarly, one or more of the described steps may be omitted, depending upon the specific operational environment the method is being implemented in. In addition, acts in accordance with the present disclosure may be performed by a programmable control device executing instructions organized into one or more program modules. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Storage devices, sometimes called computer readable medium, suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The foregoing description of preferred and other embodiments is not intended to limit or restrict the scope or applicability of the inventive concepts conceived of by the Applicants. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A videoconferencing apparatus, comprising:
a touch panel generating touch data and having a sensor, the sensor generating a source selection in response to user movement relative thereto; and
a videoconferencing device operatively coupled to the touch panel and to a plurality of sources, the videoconferencing device configured to:
establish a videoconference with at least one endpoint via a network,
send video from at least a first of the sources to the at least one endpoint via the network,
receive the source selection from the touch panel when user movement is made relative to the sensor,
automatically select at least one second of the sources in response to the source selection,
automatically switch from the at least one first source to the at least one second source, and
send video from the at least one second source to the at least one endpoint,
wherein the sources are selected from the group consisting of a network interface coupled to the at least one endpoint via the network, a camera, a video cassette recorder, a digital versatile disc player, a laptop computer, a personal computer, a programmable controller of visual sources, and an Extended Graphics Array splitter.

2. The apparatus of claim 1, wherein the videoconferencing device is configured to send video from one or more of the sources to the touch panel for display.

3. The apparatus of claim 1, wherein to automatically switch, the videoconferencing device is configured to:
generate a whiteboard in response to the source selection,
receive touch data from the touch screen device,
combine the received touch data as annotation to the whiteboard, and
send the annotated whiteboard to the at least one endpoint.

4. The apparatus of claim 3, wherein the videoconferencing device is configured to send the annotated whiteboard to the touch panel for display.

5. The apparatus of claim 1, further comprising a visual controller coupled between the videoconferencing device and the touch panel.

6. The apparatus of claim 5, wherein one or more of the sources are coupled to one or more video inputs of the visual controller, and wherein the visual controller comprises one or more video outputs coupled to one or more video inputs of the videoconferencing device.

7. The apparatus of claim 1, wherein the touch panel comprises a user tool movable relative to the sensor, the sensor generating the source selection when the user moves the user tool relative thereto.

8. The apparatus of claim 1, wherein the videoconferencing device is configured to control operation of at least one camera using touch data received from the touch panel.

9. The apparatus of claim 8, wherein the at least one camera comprises a near-end camera coupled to the videoconferencing device, and wherein to control operation of the near-end camera based on the associated touch control, the videoconferencing device is configured to send a control signal to the near-end camera.

10. The apparatus of claim 8, wherein the at least one camera comprises a far-end camera coupled to the at least one endpoint, and wherein to control operation of the far-end camera based on the associated touch control, the videoconferencing device is configured to send a control signal to the far-end camera via the network.

11. The apparatus of claim 8, wherein to control operation of the at least one camera, the videoconferencing device is configured to:
send video received from the at least one camera to the touch panel for display;
designate at least one area of the sent video as at least one touch control for user selection, the at least one touch control for controlling pan, tilt, or zoom of the at least one camera;
receive touch data from the touch panel;
associate the received touch data with the at least one touch control; and
control operation of the at least one camera based on the associated touch control.

12. The apparatus of claim 11, wherein the at least one camera comprises a pan-tilt-zoom camera, and wherein to designate at least one area of the sent video as at least one touch control for user selection, the videoconferencing unit is configured to generate a grid for display in conjunction with the video sent to the touch screen device, the grid having at least one area corresponding to the at least one touch control for controlling the pan, tilt, or zoom of the at least one camera.

13. The apparatus of claim 12, wherein the grid comprises a first pair of areas corresponding to first touch controls for panning the pan-tilt-zoom camera, a second pair of areas corresponding to second touch controls for tilting the pan-tilt-zoom camera, and a third pair of areas corresponding to third touch controls for zooming the pan-tilt-zoom camera.

14. The apparatus of claim 1, wherein the touch panel displays a graphical user interface and generates touch data in response to user movement relative to the graphical user interface, wherein the graphical user interface includes a plurality of separate user interface screens for conducting the videoconference.

15. The apparatus of claim 14, wherein the separate user interface screens comprise one or more of: a first screen for initiating the videoconference, a second screen for searching a directory of videoconference participants, a third screen for configuring a source of content for the videoconference, a fourth screen for controlling a camera of the videoconference, a fifth screen for configuring audio of the videoconference, and a sixth screen for scheduling a videoconference.

16. A videoconferencing method, comprising:
establishing a videoconference with at least one endpoint via a network;
sending video from a first of a plurality of sources to the at least one endpoint via the network;
receiving a source selection from a touch panel, the touch panel generating touch data and having a sensor, the sensor generating the source selection when user movement is made relative to the sensor;
automatically selecting at least one second of the sources in response to the source selection;
automatically switching from the at least one first source to the at least one second source; and
sending video from the at least one second source to the at least one endpoint,
wherein the sources are selected from the group consisting of a network interface coupled to the at least one endpoint via the network, a camera, a video cassette recorder, a digital versatile disc player, a laptop computer, a personal computer, a programmable controller of visual sources, and an Extended Graphics Array splitter.

17. The method of claim 16, further comprising sending video from one or more of the sources to the touch panel for display.

18. The method of claim 16, wherein automatically switching from the at least one first source to the at least one second source comprises:
generating a whiteboard in response to the source selection;
receiving touch data from the touch panel; and
combining the received touch data as annotation to the whiteboard for sending to the at least one endpoint.

19. The method of claim 18, further comprising sending the annotated whiteboard to the touch panel for display.

20. The method of claim 16, wherein the touch panel comprises a user tool movable relative to the sensor, the sensor generating the source selection when the user moves the user tool relative thereto.

21. The method of claim 16, further comprising controlling operation of at least one camera using touch data received from the touch panel.

22. The method of claim 21, wherein controlling the operation of the at least one camera using the touch data received from the touch panel comprises:
sending video received from the at least one camera to the touch panel for display;
designating at least one area of the sent video as at least one touch control for user selection, the at least one touch control for controlling pan, tilt, or zoom of the at least one camera;
receiving the touch data from the touch panel;
associating the received touch data with the at least one touch control; and
controlling the operation of the at least one camera based on the associated touch control.

23. The method of claim 22, wherein designating at least one area of the sent video as at least one touch control for user selection comprises generating a grid for display in conjunction with the video sent to the touch screen device, the grid having at least one area corresponding to the at least one touch control for controlling the pan, tilt, or zoom of the at least one camera.

24. The method of claim 23, wherein the grid comprises a first pair of areas corresponding to first touch controls for panning the pan-tilt-zoom camera, a second pair of areas corresponding to second touch controls for tilting the pan-tilt-zoom camera, and a third pair of areas corresponding to third touch controls for zooming the pan-tilt-zoom camera.

25. The method of claim 16, further comprising displaying a graphical user interface on the touch panel and generating touch data in response to user movement relative to the graphical user interface, wherein the graphical user interface includes a plurality of separate user interface screens for conducting the videoconference.

26. The method of claim 25, wherein the separate user interface screens comprise one or more of: a first screen for initiating the videoconference, a second screen for searching a directory of videoconference participants, a third screen for configuring a source of content for the videoconference, a fourth screen for controlling a camera of the videoconference, a fifth screen for configuring audio of the videoconference, or a sixth screen for scheduling a videoconference.

27. A videoconferencing apparatus, comprising:
a touch panel configured to generate touch data, the touch panel having a sensor generating an indication in response to user movement relative thereto;
a videoconferencing device operatively coupled to the touch panel and configured to:
establish a videoconference with at least one endpoint via a network,
send video from at least one first source to the at least one endpoint via the network,
receive the indication from the touch panel when user movement is made relative to the sensor, and
automatically switch to an annotation mode of operation in response to the indication;
wherein in the annotation mode of operation, the videoconferencing apparatus combines touch data from the touch panel as annotation to content from at least one second source and sends the annotated content to the at least one endpoint via the network and to the touch panel for display.

28. The apparatus of claim 27, wherein the at least one first source is the same as or different from the at least one second source.

29. The apparatus of claim 27, comprising a computer operatively coupled to the videoconferencing device, the computer combining the touch data from the touch panel as annotation to content and sending the annotated content to the videoconferencing device.

30. The apparatus of claim 27, wherein the annotated content sent in the annotation mode of operation comprises a whiteboard, a computer screen, an image, or visual media.

31. The apparatus of claim 27, wherein in the annotation mode of operation, the videoconferencing apparatus is configured to:
generate a whiteboard;
receive touch data from the touch panel;
combine the received touch data as annotation to the whiteboard; and
send the annotated whiteboard to the touch panel and to the at least one endpoint.

32. The apparatus of claim 27, wherein the touch panel comprises a user tool movable relative to the sensor, the sensor generating the indication when the user moves the user tool relative thereto.

33. The apparatus of claim 27, wherein the videoconferencing device is configured to:
receive another indication from the touch panel when user movement is made relative to the sensor;
automatically select at least one third source in response to the other indication;
automatically switch from the annotated content currently sent to the at least one third source automatically selected; and
send video from the at least one third source to the at least one endpoint.

34. The apparatus of claim 27, wherein the touch panel displays a graphical user interface and generates touch data in response to user movement relative to the graphical user interface, wherein the graphical user interface includes a plurality of separate user interface screens for conducting the videoconference.

35. The apparatus of claim 34, wherein the separate user interface screens comprise one or more of: a first screen for initiating the videoconference, a second screen for searching a directory of videoconference participants, a third screen for configuring a source of content for the videoconference, a fourth screen for controlling a camera of the videoconference, a fifth screen for configuring audio of the videoconference, and a sixth screen for scheduling a videoconference.

36. A videoconferencing method, comprising:
    establishing a videoconference with at least one endpoint via a network;
    sending video from at least one first source to the at least one endpoint via the network;
    receiving an indication from a touch panel configured to display video and generate touch data, the touch panel having a sensor generating the indication when user movement is made relative to the sensor;
    automatically switching to an annotation mode of operation in response to the indication;
    combining touch data from the touch panel as annotation to content from at least one second source; and
    sending the annotated content to the at least one endpoint via the network and to the touch panel for display.

37. The method of claim 36, wherein the at least one first source is the same as or different from the at least one second source.

38. The method of claim 36, wherein the annotated content sent in the annotation mode of operation comprises a whiteboard, a computer screen, an image, or visual media.

39. The method of claim 36, wherein automatically switching to the annotation mode of operation, combining the touch data, and sending the annotated content comprise:
    generating a whiteboard;
    receiving touch data from the touch panel;
    combining the received touch data as annotation to the whiteboard; and
    sending the annotated whiteboard to the touch panel and to the at least one endpoint.

40. The method of claim 36, wherein the touch panel comprises a user tool movable relative to the sensor, the sensor generating the indication when the user moves the user tool relative thereto.

41. The method of claim 36, further comprising:
    receiving another indication from the touch panel when user movement is made relative to the sensor;
    automatically selecting at least one third source in response to the other indication;
    automatically switching from the annotated content currently sent to the at least one third source automatically selected; and
    sending video from the at least one third source to the at least one endpoint.

42. The method of claim 36, further comprising displaying a graphical user interface on the touch panel and generating touch data in response to user movement relative to the graphical user interface, wherein the graphical user interface includes a plurality of separate user interface screens for conducting the videoconference.

43. The method of claim 42, wherein the separate user interface screens comprise one or more of: a first screen for initiating the videoconference, a second screen for searching a directory of videoconference participants, a third screen for configuring a source of content for the videoconference, a fourth screen for controlling a camera of the videoconference, a fifth screen for configuring audio of the videoconference, and a sixth screen for scheduling a videoconference.

* * * * *